United States Patent
Ni et al.

(10) Patent No.: US 11,356,373 B2
(45) Date of Patent: *Jun. 7, 2022

(54) SERVICE PROCESSING METHOD, APPARATUS, AND SYSTEM

(71) Applicant: HUAWEI TECHNOLOGIES CO., LTD., Guangdong (CN)

(72) Inventors: Hui Ni, Beijing (CN); Yongcui Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,598

(22) Filed: Apr. 24, 2020

(65) Prior Publication Data

US 2020/0252341 A1 Aug. 6, 2020

Related U.S. Application Data

(63) Continuation of application No. 15/958,313, filed on Apr. 20, 2018, now Pat. No. 10,693,794, which is a
(Continued)

(51) Int. Cl.
*H04L 47/20* (2022.01)
*H04L 41/5051* (2022.01)
(Continued)

(52) U.S. Cl.
CPC .......... *H04L 47/20* (2013.01); *H04L 41/5051* (2013.01); *H04L 45/38* (2013.01);
(Continued)

(58) Field of Classification Search
CPC ......... H04L 47/20; H04L 47/16; H04L 47/14; H04L 47/19; H04L 47/10; H04L 47/11;
(Continued)

(56) References Cited

U.S. PATENT DOCUMENTS

| 7,792,113 B1 | 9/2010 | Foschiano et al. |
| 8,792,353 B1 | 7/2014 | Janarthanan |

(Continued)

FOREIGN PATENT DOCUMENTS

| CN | 1798364 A | 7/2006 |
| CN | 101022464 A | 8/2007 |

(Continued)

OTHER PUBLICATIONS

Siwar Ben Hadj Said et al., "New control plane in 3GPP LTE-EPC architecture for on-demand connectivity service", The Institure of Electrical and Electronics Engineers, Inc. (IEEE) Conference Proceedings, Nov. 1, 2013, XP055306044, pp. 205-209.

(Continued)

*Primary Examiner* — Phong La
(74) *Attorney, Agent, or Firm* — Womble Bond Dickinson (US) LLP

(57) ABSTRACT

Embodiments of the present disclosure disclose a service processing method, an apparatus, and a system that relate to the field of communications technologies and are used to reduce resource waste. The method includes: controlling, by a controller, a first node to send a received packet to a processing network; and controlling, by the controller, the processing network to process the packet and then send a processed packet to a second node. The first node is a base station or a network element connected to the base station, and the second node is a routing function entity; or the first node is the routing function entity, and the second node is the base station or a network element connected to the base station. The routing function entity is an anchor point of an Internet Protocol IP address of a user.

12 Claims, 18 Drawing Sheets

Related U.S. Application Data continuation of application No. PCT/CN2015/092491, filed on Oct. 22, 2015.

(51) Int. Cl.
  *H04L 45/00* (2022.01)
  *H04L 47/2483* (2022.01)
  *H04W 40/02* (2009.01)
  *H04L 41/50* (2022.01)
  *H04L 45/74* (2022.01)

(52) U.S. Cl.
  CPC ......... *H04L 47/2483* (2013.01); *H04W 40/02* (2013.01); *H04L 41/5087* (2013.01); *H04L 45/74* (2013.01)

(58) Field of Classification Search
  CPC ............. H04L 47/2483; H04L 47/2441; H04L 47/2425; H04L 40/00; H04L 40/02; H04L 41/5051; H04L 41/5054; H04L 41/5041; H04L 41/5087; H04L 45/38; H04L 45/34; H04L 45/44; H04L 45/74; H04L 45/52; H04L 45/54
  See application file for complete search history.

(56) References Cited

U.S. PATENT DOCUMENTS

| | | |
|---|---|---|
| 2008/0186852 A1 | 8/2008 | Sami |
| 2009/0144442 A1 | 6/2009 | Zhen et al. |
| 2013/0044582 A1 | 2/2013 | Ahmed |
| 2014/0269319 A1 | 9/2014 | DeCusatis |
| 2015/0026794 A1 | 1/2015 | Zuk |
| 2015/0063346 A1 | 3/2015 | Eswara et al. |
| 2015/0215918 A1* | 7/2015 | Wu .................. H04W 72/0433 370/329 |
| 2016/0294705 A1* | 10/2016 | Wu .......................... H04L 67/16 |
| 2016/0323193 A1 | 11/2016 | Zhou et al. |
| 2016/0352629 A1* | 12/2016 | Wang .................... H04L 45/306 |
| 2016/0374095 A1 | 12/2016 | Jeon et al. |
| 2017/0054688 A1 | 2/2017 | Bhattacharjee |
| 2017/0149670 A1 | 5/2017 | Backman |
| 2017/0339110 A1* | 11/2017 | Ni ......................... H04W 48/08 |

FOREIGN PATENT DOCUMENTS

| | | |
|---|---|---|
| CN | 101123549 A | 3/2008 |
| CN | 101594640 A | 12/2009 |
| CN | 101997826 A | 3/2011 |
| CN | 102158409 A | 8/2011 |
| CN | 102265567 A | 11/2011 |
| CN | 102365845 A | 2/2012 |
| CN | 102404192 A | 4/2012 |
| CN | 103561124 A | 2/2014 |
| CN | 103906131 A | 7/2014 |
| CN | 104219144 A | 12/2014 |
| CN | 104601467 A | 5/2015 |
| CN | 104660507 A | 5/2015 |
| CN | 104982013 A | 10/2015 |
| EP | 3082304 A1 | 10/2016 |
| EP | 3110081 A1 | 12/2016 |
| KR | 2014-0099621 A | 8/2014 |
| KR | 2015-0000781 A | 1/2015 |
| WO | 2011157124 A2 | 12/2011 |
| WO | 2015100530 A1 | 7/2015 |
| WO | 2015-113281 A1 | 8/2015 |
| WO | 2015135216 A1 | 9/2015 |

OTHER PUBLICATIONS

Extended European Search Report dated Jun. 25, 2018 in corresponding European Patent Application No. 15906465.8, pp. 9.

"OpenFlow Switch Specification," Open Networking Foundation, Version 1.2 (Wire Protocol 0x03), Dec. 5, 2011, 85 pgs.

International Search Report dated Jul. 12, 2016 in Chinese, in corresponding International Patent Application No. PCT/CN2015/092491, 4 pgs.

International Search Report, from corresponding International Patent Application No. PCT/CN2015/092491, 4 pgs.

H. Li et al.,"Service Function Chaining (SFC) Control Plane Components and Requirements;draft-ietf-sfc-control-plane-00",Service Function Chaining (sfc),Internet-Draft,Aug. 28, 2015,total 26 pages.

P. Srisuresh et al.,"Traditional IP Network Address Translator (Traditional NAT)",Network Working Group;Request for Comments: 3022,Jan. 2001,total 16 pages.

F. Baker et al.,"On Firewalls in Internet Security;draft-ietf-opsawg-firewalls-01",Operations Area Working Group, Internet-Draft,Intended status: BCP;Oct. 18, 2012,total 10 pages.

J. Border et al.,"Performance Enhancing Proxies Intended to Mitigate Link-Related Degradations",Network Working Group;Request for Comments: 3135,Jun. 2001,total 45 pages.

A. Durand et al.,"Dual-Stack Lite Broadband Deployments Following IPv4 Exhaustion",Internet Engineering Task Force (IETF),Request for Comments: 6333,Aug. 2011,total 32 pages.

M. Bagnulo et al.,"Stateful NAT64: Network Address and Protocol Translation from IPv6 Clients to IPv4 Servers", Internet Engineering Task Force (IETF),Request for Comments: 6146,Apr. 2011,total 45 pages.

* cited by examiner

CONT.
FROM
FIG. 7A

After receiving the packet that is sent by the base station and carries the traffic flow identifier 1, the processing function entity 1 processes the packet according to the processing policy 1, and forwards, to the processing function entity 2 according to the second forwarding policy 1, a processed packet that carries the traffic flow identifier 1 — 709

After receiving the packet that is sent by the processing function entity 1 and carries the traffic flow identifier 1, the processing function entity 2 processes, according to the processing policy 2, the packet that carries the traffic flow identifier 1, and forwards, to the routing function entity according to the second forwarding policy 2, a processed packet that carries the traffic flow identifier 1 — 710

After receiving the packet that is sent by the processing function entity 2 and carries the traffic flow identifier 1, the routing function entity forwards the packet to an external network — 711

FIG. 7B

CONT.
FROM
FIG. 8A

The forwarder forwards, to the processing function entity 1 according to the second forwarding policy, the packet that is sent by the base station and carries the traffic flow identifier 2 — 810

After receiving the packet that is sent by the forwarder and carries the traffic flow identifier 2, the processing function entity 1 processes the packet according to the processing policy 1, and then forwards a processed packet to the forwarder — 811

The forwarder forwards, to the processing function entity 2 according to the second forwarding policy, the packet that is sent by the processing function entity 1 and carries the traffic flow identifier 2 — 812

After receiving the packet that is sent by the forwarder and carries the traffic flow identifier 2, the processing function entity 2 processes the packet according to the processing policy 2, and then forwards a processed packet to the forwarder — 813

The forwarder forwards, to the routing function entity according to the second forwarding policy, the packet that is sent by the processing function entity 2 and carries the traffic flow identifier 2 — 814

After receiving the packet that is sent by the forwarder and carries the traffic flow identifier 2, the routing function entity forwards the packet to an external network — 815

FIG. 8B

CONT.
FROM
FIG. 9A

The routing function entity forwards, to the processing function entity 2 according to the first forwarding policy, the packet that is sent by the processing function entity 1 and carries the traffic flow identifier 3 — 909

After receiving the packet that is sent by the routing function entity and carries the traffic flow identifier 3, the processing function entity 2 processes the packet according to the processing policy 2, and then forwards a processed packet to the routing function entity — 910

The routing function entity forwards, to the base station according to the first forwarding policy, the packet that is sent by the processing function entity 2 and carries the traffic flow identifier 3 — 911

After receiving the packet that is sent by the routing function entity and carries the traffic flow identifier 3, the base station forwards the packet to the UE — 912

FIG. 9B

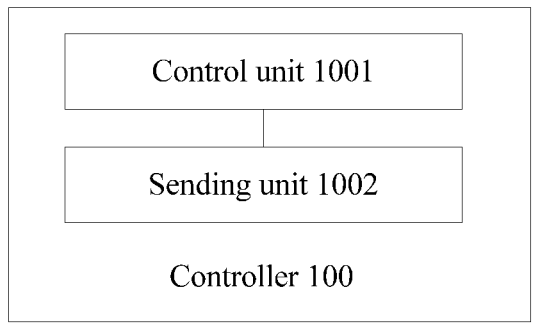

FIG. 10

SERVICE PROCESSING METHOD, APPARATUS, AND SYSTEM

CROSS-REFERENCE TO RELATED APPLICATIONS

This application is a continuation of U.S. patent application Ser. No. 15/958,313, filed on Apr. 20, 2018, which is a continuation of International Application No. PCT/CN2015/092491, filed on Oct. 22, 2015, the contents of each of which are hereby incorporated by reference in their entirety.

TECHNICAL FIELD

The present disclosure relates to the field of communications technologies, and in particular, to a service processing method, an apparatus, and a system.

BACKGROUND

Because a control plane and a forwarding plane of a mobile gateway are not separated in an evolved packet core (EPC) network, a capacity of the EPC network cannot be expanded flexibly. To resolve the problem, the control plane and the forwarding plane of the mobile gateway are separated in the prior art. As shown in FIG. 1, FIG. 1 is a schematic diagram of a network architecture in which a control function and a forwarding function of a mobile gateway are separated in an EPC network. A control plane 101 of a mobile gateway may determine a data processing rule related to a packet sent by a UE (user equipment), and delivers the data processing rule to a forwarding plane 102 by using an interface between the control plane 101 and the forwarding plane 102. The forwarding plane 102 processes, according to the data processing rule, a packet sent by a base station 103 (an external network 104), and then sends a processed packet to the external network 104 (the base station 103).

The forwarding plane integrates a point anchoring function of a user IP (Internet Protocol) address and multiple service processing functions. Therefore, the forwarding plane has an address resource and includes a computing resource. The address resource that the forwarding plane has determines a quantity of users who can be served by the forwarding plane, and the computing resource included in the forwarding plane determines a quantity of packets that can be processed by the forwarding plane at a same moment. The computing resource in the forwarding plane usually remains unchanged after delivery of a device. The address resource in the forwarding plane is allocated to a forwarding plane device by means of configuration. Address resource configuration update relates to routing information update of a peripheral network element, and usually cannot be implemented in real time.

A quantity of users in the EPC network and a quantity of packets sent by all users at a same moment do not remain unchanged. Therefore, when the forwarding plane has insufficient address resources or computing resources, a forwarding plane needs to be added. However, when the quantity of users in the EPC network increases, and the quantity of packets sent by all the users at a same moment remains unchanged, addition of a forwarding plane causes waste of the computing resource; when the quantity of users in the EPC network remains unchanged, and the quantity of packets sent by all the users at a same moment increases, addition of a forwarding plane causes waste of the address resource. Even if the quantity of users increases, and the quantity of packets sent by all the users at a same moment also increases, the address resource or the computing resource may be wasted.

SUMMARY

Embodiments of the present disclosure provide a service processing method, an apparatus, and a system, so as to reduce resource waste.

To achieve the foregoing objective, the following technical solutions are used in the embodiments of the present disclosure:

According to a first aspect, a service processing method is provided, including:

controlling, by a controller, a first node to send a received packet to a processing network; and controlling, by the controller, the processing network to process the packet and then send a processed packet to a second node; where the first node is a base station or a network element connected to the base station, and the second node is a routing function entity; or the first node is the routing function entity, and the second node is the base station or a network element connected to the base station; and the routing function entity is an anchor point of an Internet Protocol IP address of a user.

With reference to the first aspect, in a first possible implementation, the processing network includes at least one processing function entity.

With reference to the first possible implementation of the first aspect, in a second possible implementation, the controlling, by a controller, a first node to send a received packet to a processing network includes:

sending, by the controller, a first forwarding policy to the first node, where the first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier.

With reference to the second possible implementation of the first aspect, in a third possible implementation, the controlling, by the controller, the processing network to process the packet and then send a processed packet to a second node includes:

sending, by the controller, a corresponding processing policy and a second forwarding policy to one or more processing function entities in the processing network, where the processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier.

With reference to the first possible implementation of the first aspect, in a fourth possible implementation, the controlling, by a controller, a first node to send a received packet to a processing network includes:

sending, by the controller, a first forwarding policy to the first node, where the first forwarding policy is used to control the first node to forward the received packet to a forwarder, so that the forwarder forwards the packet to a first processing function entity; and the first processing function entity is a processing function entity in the processing network.

With reference to the first possible implementation or the fourth possible implementation of the first aspect, in a fifth possible implementation, the controlling, by the controller, the processing network to process the packet and then send a processed packet to a second node includes:

sending, by the controller, a corresponding processing policy to one or more processing function entities in the processing network, where the processing policy is used to control a processing function entity that receives the processing policy to process, according to the processing policy, the received packet sent by the forwarder, and then send the processed packet to the forwarder; and sending, by the controller, a second forwarding policy to the forwarder, where the second forwarding policy is used to control the forwarder to forward the received packet according to the second forwarding policy, so that the packet reaches the second node after the packet is sequentially processed by the one or more processing function entities.

With reference to the first possible implementation of the first aspect, in a sixth possible implementation, the controlling, by the controller, the processing network to process the packet and then send a processed packet to a second node includes:

sending, by the controller, a corresponding processing policy to one or more processing function entities in the processing network, where the processing policy is used to control a processing function entity that receives the processing policy to process, according to the processing policy, the received packet sent by the routing function entity, and then send the processed packet to the routing function entity; and sending, by the controller, a first forwarding policy to the routing function entity, where the first forwarding policy is used to control the routing function entity to forward the received packet according to the first forwarding policy, so that the packet reaches the second node after the packet is sequentially processed by the one or more processing function entities.

With reference to the sixth possible implementation of the first aspect, in a seventh possible implementation, when the first node is the base station or the network element connected to the base station, the controlling, by a controller, a first node to send a received packet to a processing network includes:

sending, by the controller, a second forwarding policy to the first node, where the second forwarding policy is used to control the first node to forward the received packet to the routing function entity, so that the routing function entity forwards the packet to a first processing function entity according to the first forwarding policy; and the first processing function entity is a processing function entity in the processing network.

With reference to the third possible implementation or the fifth possible implementation or the seventh possible implementation of the first aspect, in an eighth possible implementation, the controller includes at least one processing controller and a routing controller, the routing controller is configured to send the first forwarding policy and the second forwarding policy, and the at least one processing controller is configured to send the processing policy.

With reference to the third possible implementation of the first aspect, in a ninth possible implementation, the controller includes at least one processing controller and a routing controller, the routing controller is configured to send the first forwarding policy to the first node and send the corresponding second forwarding policy to the one or more processing function entities, and the at least one processing controller is configured to send the corresponding processing policy to the one or more processing function entities.

With reference to the ninth possible implementation of the first aspect, in a tenth possible implementation, the method further includes:

determining, by the routing controller, the traffic flow identifier, and sending the traffic flow identifier to the at least one processing controller; and receiving, by the at least one processing controller, the traffic flow identifier sent by the routing controller, and generating, according to the traffic flow identifier, the processing policy corresponding to the one or more processing function entities.

With reference to the ninth possible implementation or the tenth possible implementation of the first aspect, in an eleventh possible implementation, the method further includes:

determining, by the at least one processing controller, the first processing function entity; and sending, by a target processing controller, the identifier of the first processing function entity to the routing controller, where the target processing controller is any one of the at least one processing controller; and the routing controller is further configured to: receive the identifier of the first processing function entity that is sent by the target processing controller, and generate the first forwarding policy according to the identifier of the first processing function entity and the traffic flow identifier.

With reference to the third possible implementation of the first aspect, in a twelfth possible implementation, the controller includes at least one processing controller and a routing controller, the routing controller is configured to send the first forwarding policy to the first node, the at least one processing controller is configured to send the corresponding processing policy to the one or more processing function entities in the processing network, and the processing policy includes the second forwarding policy.

According to a second aspect, a service processing method is provided, including:

receiving, by a processing function entity, a processing policy;

processing, by the processing function entity, a received packet according to the processing policy; and forwarding, by the processing function entity, a processed packet.

With reference to the second aspect, in a first possible implementation, before the forwarding, by the processing function entity, a processed packet, the method further includes:

receiving, by the processing function entity, a second forwarding policy;

and the forwarding, by the processing function entity, a processed packet includes: forwarding, by the processing function entity, the processed packet according to the second forwarding policy.

According to a third aspect, a controller is provided, including:

a control unit, configured to: control a first node to send a received packet to a processing network, and control the processing network to process the packet and then send a processed packet to a second node, where the first node is a base station or a network element connected to the base station, and the second node is a routing function entity; or the first node is the routing function entity, and the second node is the base station or a network element connected to the base station; and the routing function entity is an anchor point of an Internet Protocol IP address of a user.

With reference to the third aspect, in a first possible implementation, the processing network includes at least one processing function entity.

With reference to the first possible implementation of the third aspect, in a second possible implementation, the controller further includes:

a sending unit, configured to send a first forwarding policy to the first node, where the first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier.

With reference to the second possible implementation of the third aspect, in a third possible implementation, the sending unit is further configured to send a corresponding processing policy and a second forwarding policy to one or more processing function entities in the processing network, where the processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier.

With reference to the first possible implementation of the third aspect, in a fourth possible implementation, the controller further includes:

a sending unit, configured to send a first forwarding policy to the first node, where the first forwarding policy is used to control the first node to forward the received packet to a forwarder, so that the forwarder forwards the packet to a first processing function entity; and the first processing function entity is a processing function entity in the processing network.

With reference to the first possible implementation or the fourth possible implementation of the third aspect, in a fifth possible implementation, the sending unit is further configured to send a corresponding processing policy to one or more processing function entities in the processing network, where the processing policy is used to control a processing function entity that receives the processing policy to process, according to the processing policy, the received packet sent by the forwarder, and then send the processed packet to the forwarder; and the sending unit is further configured to send a second forwarding policy to the forwarder, where the second forwarding policy is used to control the forwarder to forward the received packet according to the second forwarding policy, so that the packet reaches the second node after the packet is sequentially processed by the one or more processing function entities.

With reference to the first possible implementation of the third aspect, in a sixth possible implementation, the controller further includes:

a sending unit, configured to send a corresponding processing policy to one or more processing function entities in the processing network, where the processing policy is used to control a processing function entity that receives the processing policy to process, according to the processing policy, the received packet sent by the routing function entity, and then send the processed packet to the routing function entity; and the sending unit is further configured to send a first forwarding policy to the routing function entity, where the first forwarding policy is used to control the routing function entity to forward the received packet according to the first forwarding policy, so that the packet reaches the second node after the packet is sequentially processed by the one or more processing function entities.

With reference to the sixth possible implementation of the third aspect, in a seventh possible implementation, when the first node is the base station or the network element connected to the base station, the sending unit is further configured to send a second forwarding policy to the first node, where the second forwarding policy is used to control the first node to forward the received packet to the routing function entity, so that the routing function entity forwards the packet to a first processing function entity according to the first forwarding policy; and the first processing function entity is a processing function entity in the processing network.

With reference to the third possible implementation or the fifth possible implementation or the seventh possible implementation of the third aspect, in an eighth possible implementation, the controller includes at least one processing unit and a routing unit;

the routing unit is configured to send the first forwarding policy and the second forwarding policy; and the at least one processing unit is configured to send the processing policy.

With reference to the third possible implementation of the third aspect, in a ninth possible implementation, the controller includes at least one processing unit and a routing unit;

the routing unit is configured to: send the first forwarding policy to the first node, and send the corresponding second forwarding policy to the one or more processing function entities; and the at least one processing unit is configured to send the corresponding processing policy to the one or more processing function entities.

With reference to the ninth possible implementation of the third aspect, in a tenth possible implementation, the routing unit is further configured to determine the traffic flow identifier, and send the traffic flow identifier to the at least one processing unit; and the at least one processing unit is further configured to: receive the traffic flow identifier sent by the routing unit, and generate, according to the traffic flow identifier, the processing policy corresponding to the one or more processing function entities.

With reference to the ninth possible implementation or the tenth possible implementation of the third aspect, in an eleventh possible implementation, the at least one processing unit is further configured to determine the first processing function entity; and a target processing unit sends the identifier of the first processing function entity to the routing unit, where the target processing unit is any one of the at least one processing unit; and the routing unit is further configured to: receive the identifier of the first processing function entity that is sent by the target processing unit, and generate the first forwarding policy according to the identifier of the first processing function entity and the traffic flow identifier.

With reference to the third possible implementation of the third aspect, in a twelfth possible implementation, the controller includes at least one processing unit and a routing unit;

the routing unit is configured to send the first forwarding policy to the first node; and the at least one processing unit is configured to send the corresponding processing policy to the one or more processing function entities in the processing network, where the processing policy includes the second forwarding policy.

According to a fourth aspect, a processing function entity is provided, including:

a receiving unit, configured to receive a processing policy;

an execution unit, configured to process a received packet according to the processing policy; and a forwarding unit, configured to forward a processed packet.

With reference to the fourth aspect, in a first possible implementation, the receiving unit is further configured to receive a second forwarding policy; and the forwarding unit is specifically configured to forward the processed packet according to the second forwarding policy.

According to a fifth aspect, a controller is provided, including a memory and a processor; and the memory stores a group of code, and the code is used to control the processor to perform the following actions:

controlling a first node to send a received packet to a processing network, and controlling the processing network to process the packet and then send a processed packet to a second node, where the first node is a base station or a network element connected to the base station, and the second node is a routing function entity; or the first node is the routing function entity, and the second node is the base station or a network element connected to the base station; and the routing function entity is an anchor point of an Internet Protocol IP address of a user.

With reference to the fifth aspect, in a first possible implementation, the processing network includes at least one processing function entity.

With reference to the first possible implementation of the fifth aspect, in a second possible implementation, the controller further includes a transmitter; and the transmitter is configured to send a first forwarding policy to the first node, where the first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier.

With reference to the second possible implementation of the fifth aspect, in a third possible implementation, the transmitter is further configured to send a corresponding processing policy and a second forwarding policy to one or more processing function entities in the processing network, where the processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier.

With reference to the first possible implementation of the fifth aspect, in a fourth possible implementation, the controller further includes a transmitter; and the transmitter is configured to send a first forwarding policy to the first node, where the first forwarding policy is used to control the first node to forward the received packet to a forwarder, so that the forwarder forwards the packet to a first processing function entity; and the first processing function entity is a processing function entity in the processing network.

With reference to the first possible implementation or the fourth possible implementation of the fifth aspect, in a fifth possible implementation, the transmitter is further configured to send a corresponding processing policy to one or more processing function entities in the processing network, where the processing policy is used to control a processing function entity that receives the processing policy to process, according to the processing policy, the received packet sent by the forwarder, and then send the processed packet to the forwarder; and the transmitter is further configured to send a second forwarding policy to the forwarder, where the second forwarding policy is used to control the forwarder to forward the received packet according to the second forwarding policy, so that the packet reaches the second node after the packet is sequentially processed by the one or more processing function entities.

With reference to the first possible implementation of the fifth aspect, in a sixth possible implementation, the controller further includes a transmitter;

the transmitter is configured to send a corresponding processing policy to one or more processing function entities in the processing network, where the processing policy is used to control a processing function entity that receives the processing policy to process, according to the processing policy, the received packet sent by the routing function entity, and then send the processed packet to the routing function entity; and the transmitter is further configured to send a first forwarding policy to the routing function entity, where the first forwarding policy is used to control the routing function entity to forward the received packet according to the first forwarding policy, so that the packet reaches the second node after the packet is sequentially processed by the one or more processing function entities.

With reference to the sixth possible implementation of the fifth aspect, in a seventh possible implementation, when the first node is the base station or the network element connected to the base station, the transmitter is further configured to send a second forwarding policy to the first node, where the second forwarding policy is used to control the first node to forward the received packet to the routing function entity, so that the routing function entity forwards the packet to a first processing function entity according to the first forwarding policy, and the first processing function entity is a processing function entity in the processing network.

With reference to the third possible implementation or the fifth possible implementation or the seventh possible implementation of the fifth aspect, in an eighth possible implementation, the controller includes at least one processing controller and a routing controller;

the routing controller is configured to send the first forwarding policy and the second forwarding policy; and the at least one processing controller is configured to send the processing policy.

With reference to the third possible implementation of the fifth aspect, in a ninth possible implementation, the controller includes at least one processing controller and a routing controller;

the routing controller is configured to: send the first forwarding policy to the first node, and send the corresponding second forwarding policy to the one or more processing function entities; and the at least one processing controller is configured to send the corresponding processing policy to the one or more processing function entities.

With reference to the ninth possible implementation of the fifth aspect, in a tenth possible implementation, the routing controller is further configured to determine the traffic flow identifier, and send the traffic flow identifier to the at least one processing controller; and the at least one processing controller is further configured to: receive the traffic flow identifier sent by the routing controller, and generate, according to the traffic flow identifier, the processing policy corresponding to the one or more processing function entities.

With reference to the ninth possible implementation or the tenth possible implementation of the fifth aspect, in an eleventh possible implementation, the at least one processing controller is further configured to determine the first processing function entity; and a target processing controller sends the identifier of the first processing function entity to the routing controller, where the target processing controller is any one of the at least one processing controller; and the routing controller is further configured to: receive the identifier of the first processing function entity that is sent by the target processing controller, and generate the first forwarding policy according to the identifier of the first processing function entity and the traffic flow identifier.

With reference to the third possible implementation of the fifth aspect, in a twelfth possible implementation, the controller includes at least one processing controller and a routing controller;

the routing controller is configured to send the first forwarding policy to the first node; and the at least one processing controller is configured to send the corresponding processing policy to the one or more processing function entities in the processing network, where the processing policy includes the second forwarding policy.

According to a sixth aspect, a processing function entity is provided, including a receiver, a memory, and a processor;

the receiver is configured to receive a processing policy; and the memory stores a group of code, and the code is used to control the processor to perform the following actions: processing a received packet according to the processing policy, and forwarding a processed packet.

With reference to the sixth aspect, in a first possible implementation, the receiver is further configured to receive a second forwarding policy; and the processor is specifically configured to forward the processed packet according to the second forwarding policy.

According to a seventh aspect, a network system is provided, where the network system includes: a controller, and a first node, a processing network, and a second node that are connected to the controller;

the controller is configured to: control the first node to send a received packet to the processing network, and control the processing network to process the packet and then send a processed packet to the second node;

the processing network is configured to: receive the packet sent by the first node, and process, under control of the controller, the packet and then send the processed packet to the second node;

the first node is configured to: receive the packet, and send, under control of the controller, the packet to the processing network;

the second node is configured to receive the packet sent by the processing network; and the first node is a base station or a network element connected to the base station, and the second node is a routing function entity; or the first node is the routing function entity, and the second node is the base station or a network element connected to the base station; and the routing function entity is an anchor point of an Internet Protocol IP address of a user.

With reference to the seventh aspect, in a first possible implementation, the processing network includes at least one processing function entity, and each of the at least one processing function entity is connected to the controller.

With reference to the first possible implementation of the seventh aspect, in a second possible implementation, the controller is specifically configured to send a first forwarding policy to the first node, where the first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier; and the first node is specifically configured to: receive the first forwarding policy sent by the controller, and forward the received packet to the first processing function entity according to the first forwarding policy.

With reference to the second possible implementation of the seventh aspect, in a third possible implementation, the controller is specifically configured to send a corresponding processing policy and a second forwarding policy to one or more processing function entities in the processing network, where the processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier; and each of the one or more processing function entities is specifically configured to: receive a processing policy and a second forwarding policy that are corresponding to the processing function entity and are sent by the controller, process the received packet according to the processing policy, and forward, according to the second forwarding policy, the packet processed by the processing function entity.

With reference to the first possible implementation of the seventh aspect, in a fourth possible implementation, the system further includes a forwarder connected to the controller;

the controller is specifically configured to send a first forwarding policy to the first node, where the first forwarding policy is used to control the first node to forward the received packet to the forwarder;

the first node is specifically configured to: receive the first forwarding policy sent by the controller, and forward the received packet to the forwarder according to the first forwarding policy; and the forwarder is configured to: receive the packet sent by the first node, and forward the packet to a first processing function entity, where the first processing function entity is a processing function entity in the processing network.

With reference to the first possible implementation or the fourth possible implementation of the seventh aspect, in a fifth possible implementation, the controller is further configured to send a corresponding processing policy to one or more processing function entities in the processing network, where the processing policy is used to control a processing function entity that receives the processing policy to process, according to the processing policy, the received packet sent by the forwarder, and then send the processed packet to the forwarder;

the controller is further configured to send a second forwarding policy to the forwarder, where the second forwarding policy is used to control the forwarder to forward the received packet according to the second forwarding policy;

the forwarder is specifically configured to: receive the second forwarding policy sent by the controller, and forward the received packet according to the second forwarding policy, so that the packet reaches the second node after the packet is sequentially processed by the one or more processing function entities; and each of the one or more processing function entities is specifically configured to: receive a processing policy that is corresponding to the processing function entity and is sent by the controller; and process, according to the processing policy, the received packet sent by the forwarder, and then send the processed packet to the forwarder.

With reference to the first possible implementation of the seventh aspect, in a sixth possible implementation, the controller is further configured to send a corresponding processing policy to one or more processing function entities in the processing network, where the processing policy is used to control a processing function entity that receives the processing policy to process, according to the processing policy, the received packet sent by the routing function entity, and then send the processed packet to the routing function entity;

the controller is further configured to send a first forwarding policy to the routing function entity, where the first forwarding policy is used to control the routing function entity to forward the received packet according to the first forwarding policy;

the routing function entity is specifically configured to: receive the first forwarding policy sent by the controller, and forward the received packet according to the first forwarding policy, so that the packet reaches the second node after the packet is sequentially processed by the one or more processing function entities; and each of the one or more processing function entities is specifically configured to: receive a processing policy that is corresponding to the processing function entity and is sent by the controller; and process, according to the processing policy, the received packet sent by the routing function entity, and then send the processed packet to the routing function entity.

With reference to the sixth possible implementation of the seventh aspect, in a seventh possible implementation, when the first node is the base station or the network element connected to the base station, the controller is further configured to send a second forwarding policy to the first node, where the second forwarding policy is used to control the first node to forward the received packet to the routing function entity;

the first node is specifically configured to: receive the second forwarding policy sent by the controller, and forward the received packet to the routing function entity according to the second forwarding policy; and the routing function entity is configured to: receive the packet sent by the first node, and forward the packet to the first processing function entity according to the first forwarding policy.

With reference to the third possible implementation of the seventh aspect, in an eighth possible implementation, the controller includes at least one processing controller and a routing controller, the routing controller is connected to the first node, the second node, and the one or more processing function entities, and each of the one or more processing function entities is connected to at least one of the processing controller;

the routing controller is specifically configured to: send the first forwarding policy to the first node, and send the corresponding second forwarding policy to the one or more processing function entities; and the at least one processing controller is specifically configured to send the corresponding processing policy to the one or more processing function entities.

With reference to the eighth possible implementation of the seventh aspect, in a ninth possible implementation, the routing controller is connected to each of the at least one of processing controller;

the routing controller is further configured to: determine the traffic flow identifier, and send the traffic flow identifier to the at least one processing controller; and the at least one processing controller is further configured to: receive the traffic flow identifier sent by the routing controller, and generate, according to the traffic flow identifier, the processing policy corresponding to the one or more processing function entities.

With reference to the eighth possible implementation or the ninth possible implementation of the seventh aspect, in a tenth possible implementation, the at least one processing controller is further configured to determine the first processing function entity; and a target processing controller sends the identifier of the first processing function entity to the routing controller, where the target processing controller is any one of the at least one processing controller; and the routing controller is further configured to: receive the identifier of the first processing function entity that is sent by the target processing controller, and generate the first forwarding policy according to the identifier of the first processing function entity and the traffic flow identifier.

With reference to the third possible implementation of the seventh aspect, in an eleventh possible implementation, the controller includes at least one processing controller and a routing controller, the routing controller is connected to the first node and the second node, and each of the one or more processing function entities is connected to at least one of the processing controller;

the routing controller is configured to send the first forwarding policy to the first node; and the at least one processing controller is configured to send the corresponding processing policy to the one or more processing function entities, where the processing policy includes the second forwarding policy.

With reference to the fifth possible implementation of the seventh aspect, in a twelfth possible implementation, the controller includes at least one processing controller and a routing controller, the routing controller is connected to the first node, the second node, and the forwarder, and each of the one or more processing function entities is connected to at least one of the processing controller;

the routing controller is specifically configured to: send the first forwarding policy to the first node, and send the second forwarding policy to the forwarder; and the at least one processing controller is specifically configured to send the corresponding processing policy to the one or more processing function entities.

With reference to the seventh possible implementation of the seventh aspect, in a thirteenth possible implementation, the controller includes at least one processing controller and a routing controller, the routing controller is connected to the first node and the second node, and each of the one or more processing function entities is connected to at least one of the processing controller;

the routing controller is specifically configured to: send the first forwarding policy to the routing function entity, and send the second forwarding policy to the first node; and the at least one processing controller is specifically configured to send the corresponding processing policy to the one or more processing function entities.

According to the method, the apparatus, and the system that are provided in the embodiments of the present disclosure, a forwarding plane is divided into a processing network and a routing function entity. The processing network is configured to process a packet, and therefore, the processing network includes a computing resource. The routing function entity serves as an anchor point of a user IP address, and has an address resource. When a network has insufficient address resources, a routing function entity may be added. When the network has insufficient computing resources, a processing network may be added. Therefore, compared with the prior art, according to the method provided in the embodiments of the present disclosure, waste of an address resource or a computing resource can be reduced.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 7A and FIG. 7B are a flowchart of another service processing method according to an embodiment of the present disclosure;

FIG. 8A and FIG. 8B are a flowchart of another service processing method according to an embodiment of the present disclosure;

FIG. 9A and FIG. 9B are a flowchart of another service processing method according to an embodiment of the present disclosure;

FIG. 10 is a schematic structural diagram of a controller according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The character "/" in this specification generally indicates an "or" relationship between the associated objects. The "multiple" in this specification means two or more than two.

Embodiment 1

Figure 2:
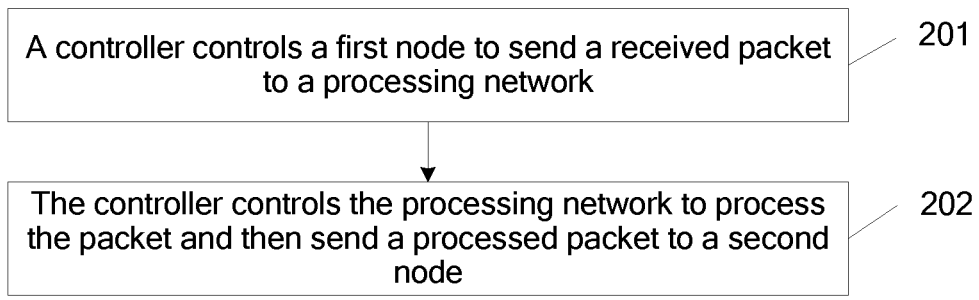
FIG. 2 is a flowchart of a service processing method according to an embodiment of the present disclosure.

This embodiment of the present disclosure provides a service processing method. As shown in FIG. 2, the method includes the following operations:

Operation 201. A controller controls a first node to send a received packet to a processing network.

Operation 202. The controller controls the processing network to process the packet and then send a processed packet to a second node.

The first node is a base station or a network element connected to the base station, and the second node is a routing function entity; or the first node is the routing function entity, and the second node is the base station or a network element connected to the base station. The routing function entity is an anchor point of a user IP address.

For example, the method provided in this embodiment of the present disclosure may be applied to at least an EPS (evolved packet system) network (all networks in the following specification are the network, and all schematic architectural diagrams of network systems are schematic architectural diagrams of a system of the network). The EPS network includes an E-UTRAN (evolved universal terrestrial radio access network) and an EPC network.

In the present disclosure, the routing function entity is an anchor point of an IP address. This means that the routing function entity is responsible for providing an IP routing capability for an IP address allocated to UE by the routing function entity. That is, the routing function entity is responsible for receiving a downlink packet (a packet sent to the UE from an external network) whose destination IP is the IP address, and sending, to the external network, an uplink packet (a packet sent to the external network from the UE) whose source IP is the IP address. When the UE moves within an area, the routing function entity is unchanged, so as to shield impact of UE movement on the external network, and anchor the IP address. In this case, the routing function entity has an address resource. The external network in this embodiment of the present disclosure is a PDN (packet data network).

Figure 16:
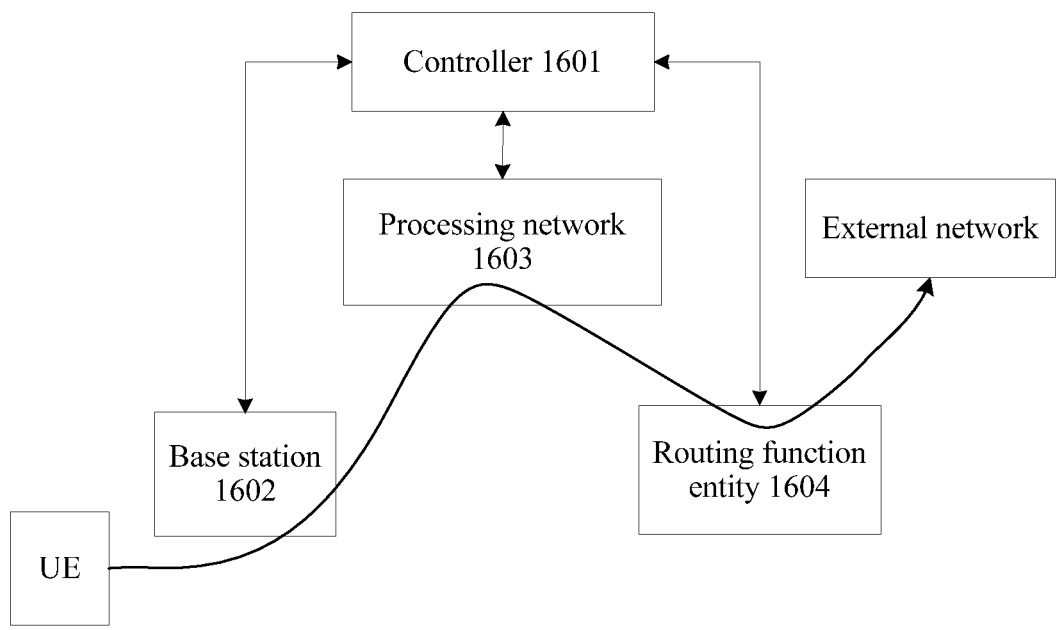
FIG. 16 is a schematic architectural diagram of a network system according to an embodiment of the present disclosure.

In specific implementation, the method may be based on an architecture of a network system shown in FIG. 16 in the following specification. After receiving a packet sent by the UE (the external network), a base station (the routing function entity) forwards the packet to the processing network. The processing network processes the packet and then sends a processed packet to the routing function entity (the base station). The routing function entity (the base station) forwards the packet to the external network (the UE) after receiving the packet. FIG. 16 shows, by using a solid line, an example of a path of a packet when the first node is a base station. The network element connected to the base station in this embodiment of the present disclosure has a function same as the base station in this embodiment of the present disclosure. Therefore, only the base station is used as an example for description in this embodiment of the present disclosure.

The UE in this embodiment of the present disclosure includes but is not limited to a mobile phone, a network access terminal device, an Internet of Things terminal device, and the like. The base station is a device that provides wireless access for the UE, and includes but is not limited to an eNodeB (evolved NodeB), a WiFi AP (Wireless Fidelity access point), a WiMAX BS (Worldwide Interoperability for Microwave Access base station), and the like. It should be noted that, for ease of description, the UE and the external network are shown in FIG. 16 to FIG. 20. It should be noted that, the processing network in this embodiment of the present disclosure is a network entity that includes at least one network node and that is used to process a packet.

According to the method provided in this embodiment of the present disclosure, a forwarding plane is divided into a processing network and a routing function entity. The processing network is configured to process a packet, and therefore, the processing network includes a computing resource. The routing function entity serves as an anchor point of a user IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

In one embodiment, the processing network includes at least one processing function entity. In this case, for an architecture of a network system, refer to FIG. 17 or FIG. 18 in the following specification.

Specifically, the processing function entity is configured to process a received packet, and processing performed on the packet includes but is not limited to execution of QoS (quality of service) control, online/offline charging, DPI (deep packet inspection), lawful interception, TCP (Transmission Control Protocol) acceleration, HTTP (Hypertext Transfer Protocol) header enrichment, and the like. One processing function entity may perform multiple types of processing on a packet, or one processing function entity may perform one type of processing on a packet. In this case, the processing function entity may be a QoS processing entity, a charging processing entity, a DPI processing entity, or the like. In this case, because in this embodiment of the present disclosure, each processing function entity has only one processing function, complex functions such as QoS control, online/offline charging, and DPI may be flexibly migrated. When a network system has a relatively large demand for a processing function entity that has a processing function, only the processing function entity may be added without adding a processing network, so that each processing function entity can be flexibly migrated. An example in which one processing function entity includes one packet processing function is used for description in the following specification.

A controller in a network system may further include a routing controller and at least one processing controller. In this case, a routing control function and a processing control function of a control plane are separated, so that deployment and coordination capabilities of the control plane are improved. In addition, the network system may further include a forwarder.

The method includes multiple specific implementations, and the specific implementations are separately described below.

In a process of describing each of the following four implementations, all mentioned traffic flow identifiers are a same traffic flow identifier, all mentioned packets are packets that carries the traffic flow identifier, all mentioned processing polices, first forwarding policies, and second forwarding policies are processing policies and forwarding policies (processing polices, first forwarding policies, and second forwarding policies that are generated for different traffic flow identifiers may be different) that are generated for the traffic flow identifier. The traffic flow identifier may be an IP address of UE, IP quintuplets of a traffic flow, or the like.

Implementation 1

Figure 3:
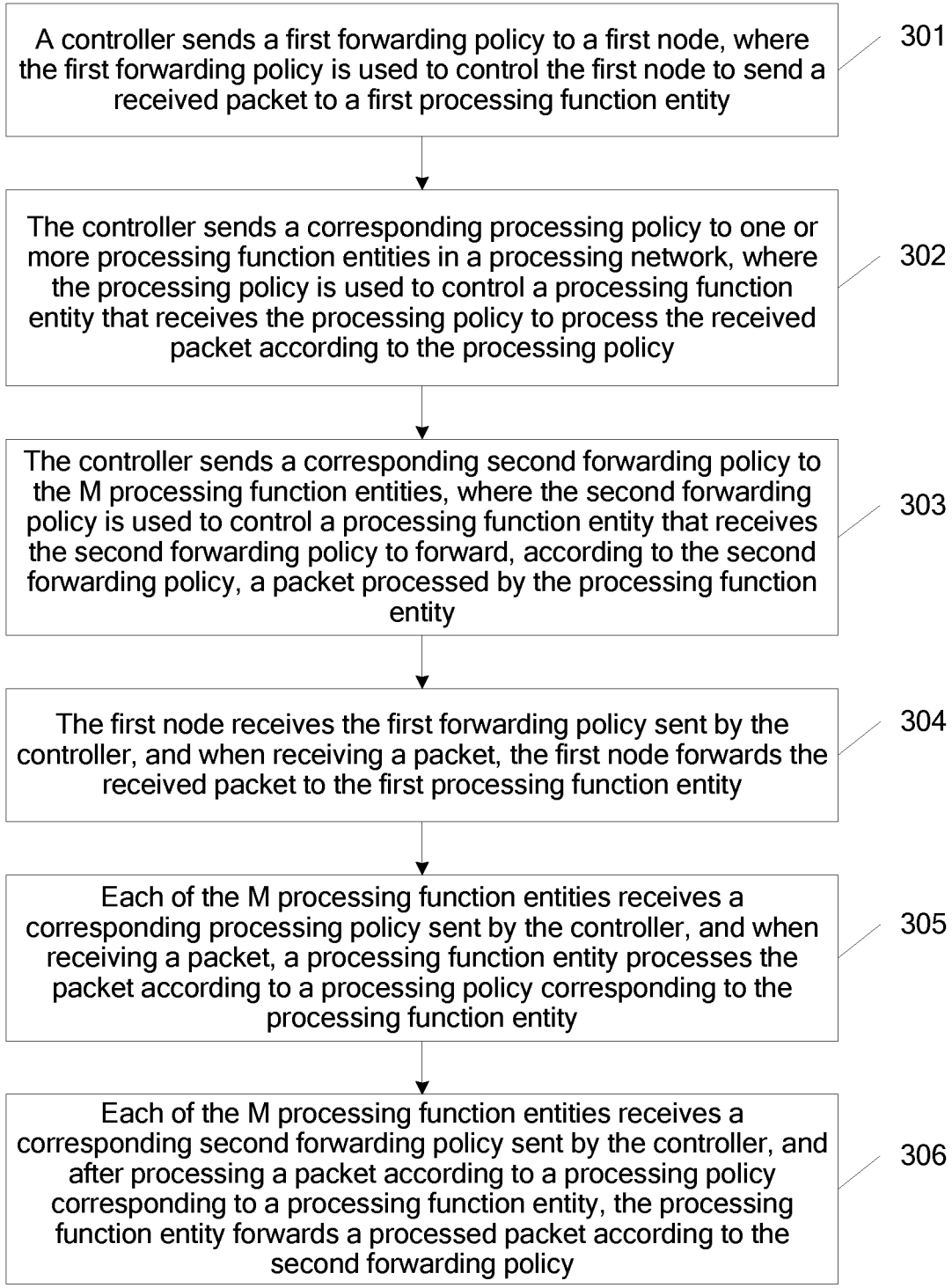
FIG. 3 is a flowchart of another service processing method according to an embodiment of the present disclosure.
Figure 17:
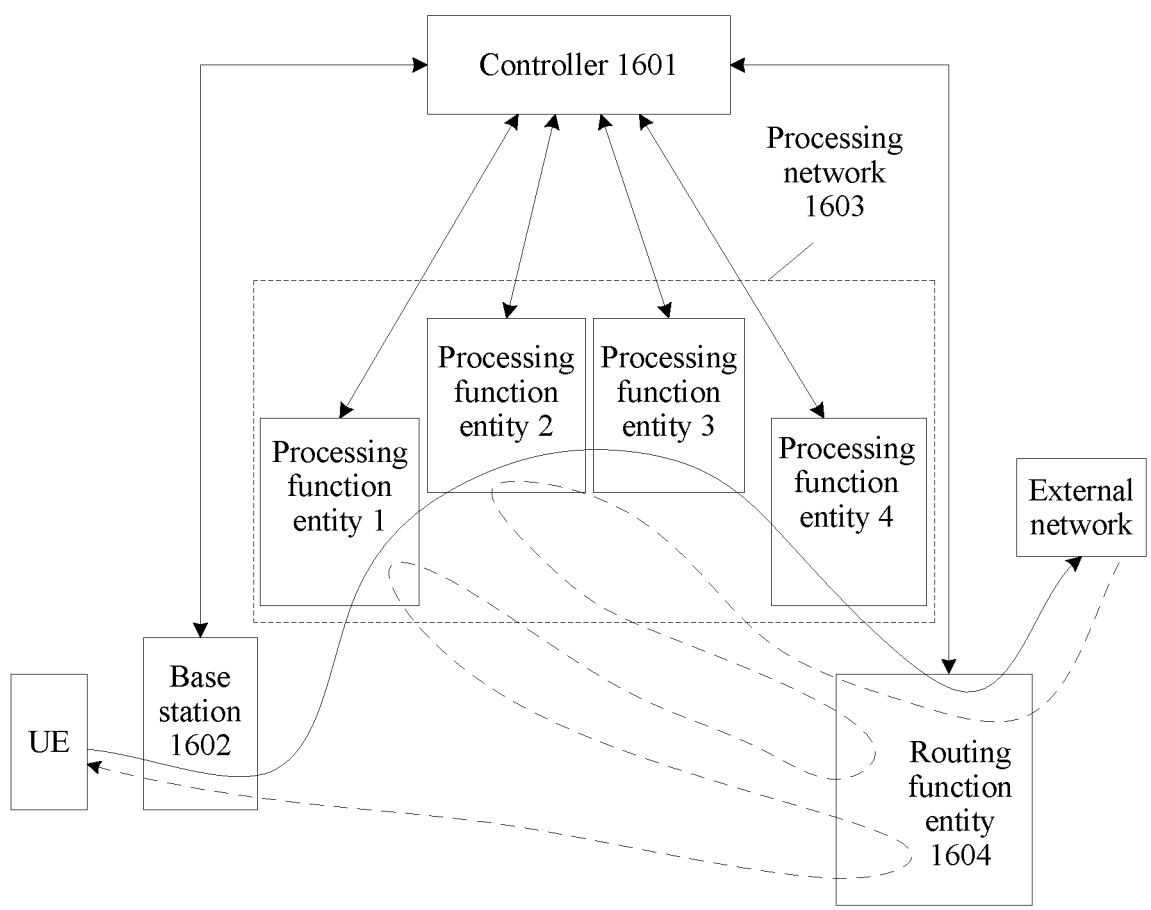
FIG. 17 is a schematic architectural diagram of another network system according to an embodiment of the present disclosure.

A schematic architectural diagram of a network system shown in FIG. 17 includes a controller, a base station, a routing function entity, and a processing network. The processing network includes at least one processing function entity (FIG. 17 is drawn by using an example in which the processing network includes four processing function entities). In an architecture of the network system shown in the following FIG. 17, as shown in FIG. 3, a specific implementation process of the foregoing method includes the following operations.

Operation 301. The controller sends a first forwarding policy to a first node, where the first forwarding policy is used to control the first node to send a received packet to a first processing function entity.

The first processing function entity is the first one in the at least one processing function entity that processes a packet.

The first forwarding policy may be generated according to an identifier of the first processing function entity and a traffic flow identifier. The traffic flow identifier may be an IP address of UE, IP quintuplets of a traffic flow, or the like. When the UE initially accesses a network, the IP address of the UE may be allocated and sent to the controller by the routing function entity, or may be allocated by the controller according to a preconfigured IP address segment corresponding to the routing function entity. The IP address of the UE may be an IPv4 (Internet Protocol version 4) address, an IPv6 (Internet Protocol version 6) address, or the like. When the traffic flow identifier is the IP quintuplets of the traffic flow, the controller may determine the traffic flow identifier according to the IP address of the UE, a destination IP address in an access request that is sent by the UE and is used to request to access the network, or a service request sent by the UE.

It should be noted that, after determining the traffic flow identifier, the controller may determine, according to the traffic flow identifier, processing logic corresponding to a packet that carries the traffic flow identifier, that is, a processing function entity that the packet passes through.

An identifier of a processing function entity may be an IP address, a MAC (Media Access Control) address, a connection port number, a tunnel identifier, or the like of the processing function entity.

Operation 302. The controller sends a corresponding processing policy to one or more processing function entities in the processing network, where the processing policy is used to control a processing function entity that receives the processing policy to process the received packet according to the processing policy.

The one or more processing function entities are all processing function entities for processing a packet. For ease of description, in the following specification, all processing function entities included in the processing network are marked as N processing function entities, and all the processing function entities for processing a packet are marked as M processing function entities. The M processing function entities include the first processing function entity, 1≤M≤N, and M is an integer.

It should be noted that, the network system includes the N processing function entities, but when a packet is to be processed, only one or more of the N processing function entities may process the packet.

Specifically, the controller may generate, according to the traffic flow identifier, a processing policy corresponding to each processing function entity. One processing function entity is corresponding to one processing policy.

Operation 303. The controller sends a corresponding second forwarding policy to the M processing function entities, where the second forwarding policy is used to control a processing function entity that receives the second forwarding policy to forward, according to the second forwarding policy, a packet processed by the processing function entity.

Specifically, the controller sends a corresponding second forwarding policy and processing policy to each of the M processing function entities.

For example, when QoS control processing and then DPI processing need to be performed on a packet, M may be equal to 2, and the M processing function entities may be a QoS processing entity and a DPI processing entity.

Second forwarding policies corresponding to the M processing function entities may be the same or may be different. When the second forwarding policies corresponding to the M processing function entities are the same, the second forwarding policy may be a general forwarding policy generated according to the traffic flow identifier, identifiers of the M processing function entities, and an identifier of a second node. When the second forwarding policies corresponding to the M processing function entities are different, a second forwarding policy corresponding to a processing function entity may be generated according to the traffic flow identifier and an identifier of a next node corresponding to the processing function entity. A next node corresponding to a processing function entity is a target node to which the processing function entity needs to send a packet obtained after the processing function entity processes a received packet.

Based on the architecture of the network system shown in FIG. 17, an example in which the first node is the base station, and the second node is the routing function entity (it is assumed that an identifier of the routing function entity is B) is used. It is assumed that a sequence of the four processing function entities for processing a packet is: a processing function entity 1 whose identifier is 1—a processing function entity 2 whose identifier is 2—a processing function entity 3 whose identifier is 3—a processing function entity 4 whose identifier is 4. In this case, the processing function entity 1 is the first processing function entity. After the packet passes through the base station, the packet is processed by the four processing function entities, and then a processed packet is forwarded to the routing function entity. The routing function entity forwards the received packet to an external network. A path of the packet is indicated by using a solid line in FIG. 17.

In this case, when second forwarding policies corresponding to the four processing function entities are the same, a form of the second forwarding policy specific to the traffic flow identifier may be 1-2-3-4-B. After receiving the second forwarding policy, each processing function entity can determine, according to an identifier of the processing function entity and the second forwarding policy, a next node corresponding to the processing function entity. When the second forwarding policies corresponding to the four processing function entities are different, the processing function entity 1 is used as an example, and a second forwarding policy corresponding to the processing function entity 1 may include the traffic flow identifier and the identifier 2. When receiving a packet, the processing function entity 1 can determine, according to the second forwarding policy, to process the packet and then forward a processed packet to a node (that is, the processing function entity 2) whose identifier is 2. The processing function entity 4 is used as an example, and a second forwarding policy corresponding to the processing function entity 4 may include the traffic flow identifier and the identifier B. When receiving a packet, the processing function entity 4 can determine, according to the second forwarding policy, to process the packet and then forward a processed packet to a node (that is, the routing function entity) whose identifier is B. Each processing function entity can determine, according to a second forwarding policy corresponding to the processing function entity, a next node corresponding to the processing function entity.

A sequence for performing operation 301, operation 302, and operation 303 is not specifically limited in this embodiment of the present disclosure.

Operation 304. The first node receives the first forwarding policy sent by the controller, and when receiving a packet, the first node forwards the received packet to the first processing function entity according to the first forwarding policy.

Specifically, the first forwarding policy is generated according to the identifier of the first processing function entity and the traffic flow identifier. Therefore, when the first node receives a packet, if the packet carries the traffic flow identifier, the first node determines, according to the first forwarding policy, to forward the packet to the first processing function entity.

Based on the path indicated by the solid line in FIG. 17, when receiving a packet, the base station forwards the received packet to the processing function entity 1 according to the first forwarding policy.

Operation 305. Each of the M processing function entities receives a corresponding processing policy sent by the controller, and when receiving a packet, a processing function entity processes the packet according to a processing policy corresponding to the processing function entity.

Specifically, the processing policy is generated according to the traffic flow identifier. Therefore, when the processing function entity receives a packet, if the packet carries the traffic flow identifier, the processing function entity processes the packet according to the processing policy.

Operation 306. Each of the M processing function entities receives a corresponding second forwarding policy sent by the controller, and after processing a packet according to a processing policy corresponding to a processing function entity, the processing function entity forwards a processed packet according to the second forwarding policy.

For example, based on the path indicated by the solid line in FIG. 17, when a packet reaches the base station, the base station forwards the packet to the processing function entity 1 according to the first forwarding policy. The processing function entity 1 processes the packet according to a received processing policy, and then forwards a processed packet to the processing function entity 2 according to a received second forwarding policy. The processing function entity 2 processes the packet according to a received processing policy, and then forwards a processed packet to the processing function entity 3 according to a received second forwarding policy. Actions performed by the processing function entity 3 and the processing function entity 4 are similar to those performed by the processing function entity 1 and the processing function entity 2. Therefore, the packet can reach the routing function entity after the packet is processed and forwarded by the processing function entity 1, the processing function entity 2, the processing function entity 3, and the processing function entity 4.

In a possible implementation, the controller may add the second forwarding policy to the processing policy. In this case, operation 303 and operation 306 may be omitted. The processing function entity may directly process and forward a packet according to the processing policy. In addition, the controller may include the second forwarding policy and the processing policy in a same message, and send the message to the processing function entity.

In another possible implementation, the first forwarding policy and the second forwarding policy may be the same. In this case, the first forwarding policy and the second forwarding policy may be a forwarding policy generated according to identifiers of nodes on an entire path on which a packet is forwarded.

Specifically, when the second node is the base station, after receiving a packet sent by the last processing function entity in the M processing function entities that processes a packet, the base station forwards the packet to the UE. When the second node is the routing function entity, after receiving a packet sent by the last processing function entity in the M processing function entities that processes a packet, the routing function entity forwards the packet to the external network.

Implementation 2

Figure 4:
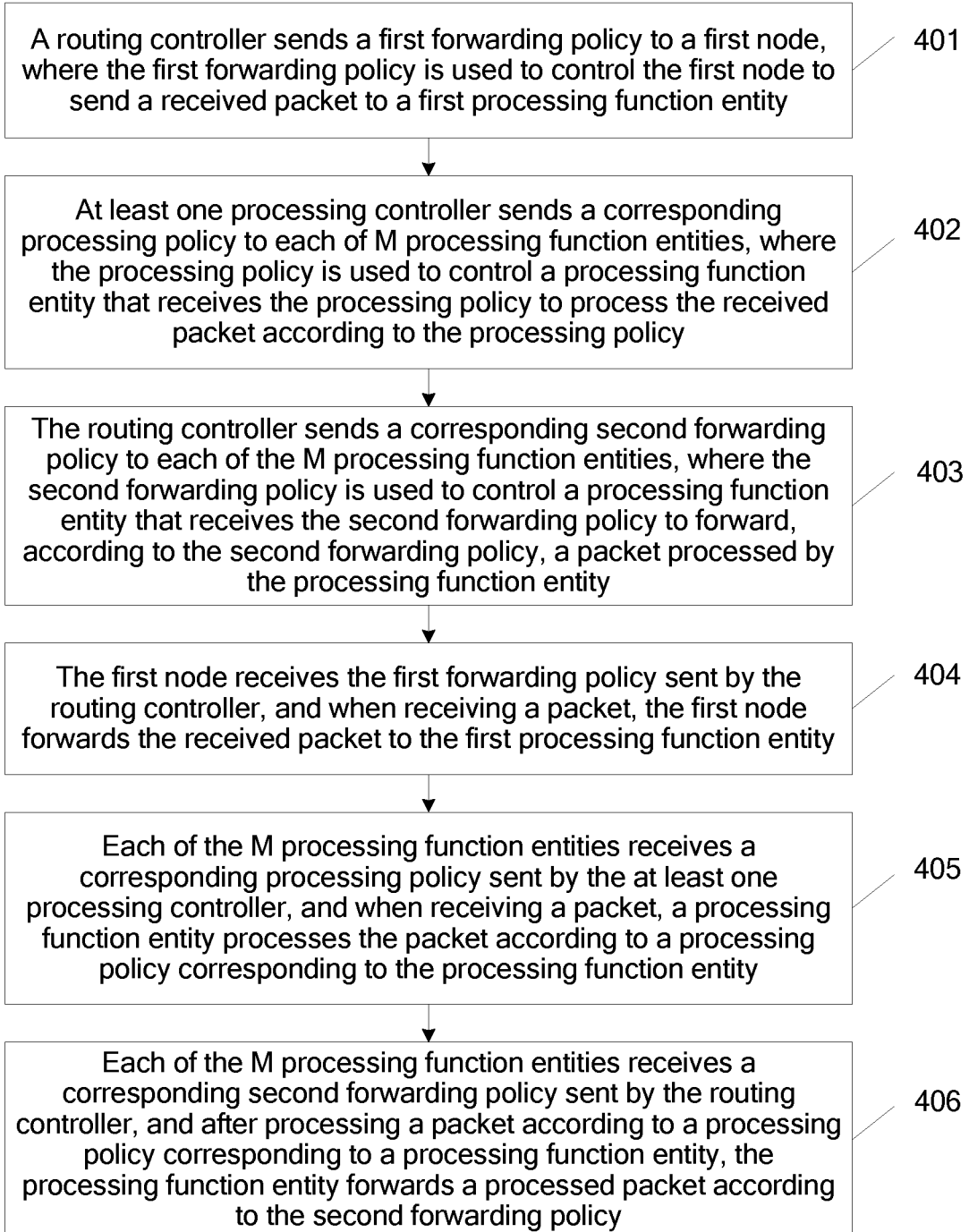
FIG. 4 is a flowchart of another service processing method according to an embodiment of the present disclosure.
Figure 19:
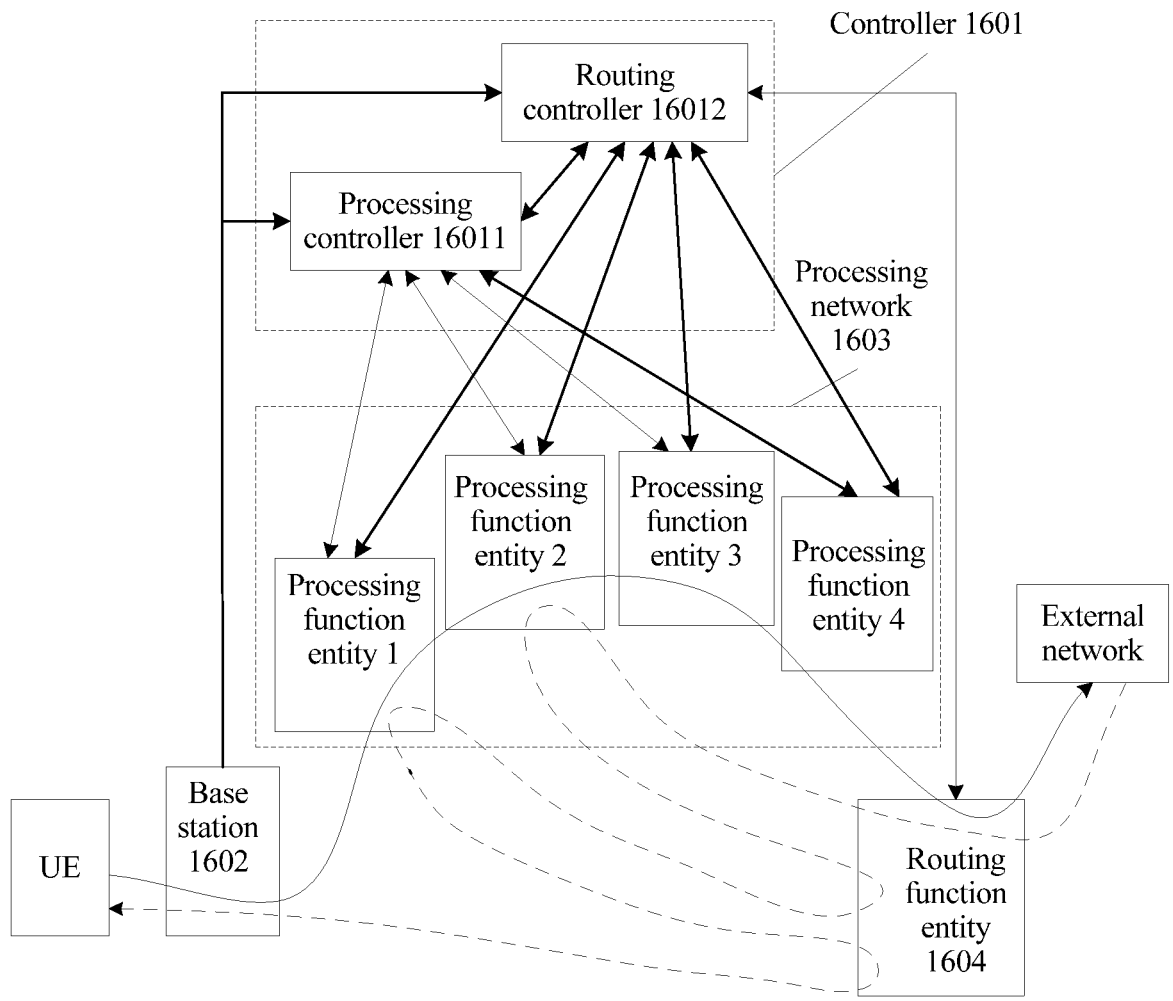
FIG. 19 is a schematic architectural diagram of another network system according to an embodiment of the present disclosure.

A schematic architectural diagram of a network system shown in FIG. 19 includes a routing controller, at least one processing controller (FIG. 19 is drawn by using an example of one processing controller), a base station, a routing function entity, and a processing network. The processing network includes N processing function entities (FIG. 19 is drawn by using an example of four processing function entities). Based on an architecture of the network system shown in FIG. 19, as shown in FIG. 4, a specific implementation process of the foregoing method includes the following operations.

Operation 401. The routing controller sends a first forwarding policy to a first node, where the first forwarding policy is used to control the first node to send a received packet to a first processing function entity.

Specifically, for related explanation in Implementation 2, refer to Implementation 1.

The first forwarding policy may be generated according to an identifier of the first processing function entity and a traffic flow identifier. The traffic flow identifier may be an IP address of UE, IP quintuplets of a traffic flow, or the like. When the UE initially accesses a network, the IP address of the UE may be allocated and sent to the routing controller by the routing function entity or sent to the routing controller and the at least one processing controller by the routing function entity, or may be allocated by the routing controller according to a preconfigured IP address segment corresponding to the routing function entity.

Specifically, when the traffic flow identifier is the IP quintuplets of the traffic flow, the routing controller and the at least one processing controller may determine the traffic flow identifier in the following several manners:

Manner 1: When a user initiates an access request to a network by using the base station, the at least one processing controller and the routing controller receive the access request, and generate the traffic flow identifier according to a destination IP address included in the access request and a first preconfiguration policy; or the at least one processing controller and the routing controller generate the traffic flow identifier according to the IP address of the UE and a second preconfiguraion policy.

Manner 2: The routing controller determines the traffic flow identifier, and separately sends the traffic flow identifier to the at least one processing controller. Each of the at least one processing controller receives the traffic flow identifier sent by the routing controller. A method for determining the traffic flow identifier by the routing controller may be as follows: When a user initiates an access request to a network by using the base station, the routing controller receives the access request, and generates the traffic flow identifier according to a destination IP address included in the access request and a first preconfiguration policy; or the routing controller generates the traffic flow identifier according to the IP address of the UE and a second preconfiguration policy.

Manner 3: When a user initiates a service request to a network by using the base station, the at least one processing controller and the routing controller receive the service request. Because the service request includes the traffic flow identifier, the at least one processing controller and the routing controller may determine the traffic flow identifier according to the service request.

Operation 402. The at least one processing controller sends a corresponding processing policy to each of M processing function entities, where the processing policy is used to control a processing function entity that receives the processing policy to process the received packet according to the processing policy.

When the network system has only one processing controller, operation 402 includes: The processing controller sends a corresponding processing policy to each of the M processing function entities in N processing function entities. When the network system has N processing controllers, operation 402 includes: M processing controllers in the N processing controllers send a corresponding processing policy to each of the M processing function entities in the corresponding N processing function entities. One processing controller is corresponding to one processing function entity, and one processing function entity is corresponding to one processing policy.

Specifically, when the network system has only one processing controller, the processing controller may generate, according to the traffic flow identifier, a processing policy corresponding to each processing function entity. When the network system has N processing controllers, M processing controllers in the N processing controllers respectively generate processing policies corresponding to the M processing function entities.

Operation 403. The routing controller sends a corresponding second forwarding policy to each of the M processing function entities, where the second forwarding policy is used to control a processing function entity that receives the second forwarding policy to forward, according to the second forwarding policy, a packet processed by the processing function entity.

For example, when QoS control processing and then DPI processing need to be performed on a packet, M may be equal to 2, and the M processing function entities may be a QoS processing entity and a DPI processing entity.

Second forwarding policies corresponding to the M processing function entities may be the same or may be different. For details, refer to description in Implementation 1.

Based on the architecture of the network system shown in FIG. 19, an example in which the first node is the base station, and a second node is the routing function entity (it is assumed that an identifier of the routing function entity is B) is used. It is assumed that a sequence of the four processing function entities for processing a packet is: a processing function entity 1 whose identifier is 1—a processing function entity 2 whose identifier is 2—a processing function entity 3 whose identifier is 3—a processing function entity 4 whose identifier is 4. In this case, the processing function entity 1 is the first processing function entity. After the packet passes through the base station, the packet is processed by the four processing function entities, and then a processed packet is forwarded to the routing function entity. The routing function entity forwards the received packet to an external network. A path of the packet is indicated by using a solid line in FIG. 19.

In this case, when second forwarding policies corresponding to the four processing function entities are the same, a form of the second forwarding policy specific to the traffic flow identifier may be 1-2-3-4-B. After receiving the second forwarding policy, each processing function entity can determine, according to an identifier of the processing function entity and the second forwarding policy, a next node corresponding to the processing function entity. When the second forwarding policies corresponding to the four processing function entities are different, the processing function entity 1 is used as an example, and a second forwarding policy corresponding to the processing function entity 1 may include the traffic flow identifier and the identifier 2. When receiving a packet, the processing function entity 1 can determine, according to the second forwarding policy, to process the packet and then forward a processed packet to a node (that is, the processing function entity 2) whose identifier is 2. The processing function entity 4 is used as an example, and a second forwarding policy corresponding to the processing function entity 4 may include the traffic flow identifier and the identifier B. When receiving a packet, the processing function entity 4 can determine, according to the second forwarding policy, to process the packet and then forward a processed packet to a node (that is, the routing function entity) whose identifier is B. Each processing function entity can determine, according to a second forwarding policy corresponding to the processing function entity, a next node corresponding to the processing function entity.

A sequence for performing operation 401, operation 402, and operation 403 is not specifically limited in this embodiment of the present disclosure.

Operation 404. The first node receives the first forwarding policy sent by the routing controller, and when receiving a packet, the first node forwards the received packet to the first processing function entity.

Specifically, the first forwarding policy is generated according to the identifier of the first processing function entity and the traffic flow identifier. Therefore, when the first node receives a packet, if the packet carries the traffic flow identifier, the first node determines, according to the first forwarding policy, to forward the packet to the first processing function entity.

Based on the path indicated by the solid line in FIG. 19, when receiving a packet, the first node forwards the received packet to the processing function entity 1 according to the first forwarding policy.

Operation 405. Each of the M processing function entities receives a corresponding processing policy sent by the at least one processing controller, and when receiving a packet, a processing function entity processes the packet according to a processing policy corresponding to the processing function entity.

Specifically, the processing policy is generated according to the traffic flow identifier. Therefore, when the processing function entity receives a packet, if the packet carries the traffic flow identifier, the processing function entity processes the packet according to the processing policy.

Operation 406. Each of the M processing function entities receives a corresponding second forwarding policy sent by the routing controller, and after processing a packet according to a processing policy corresponding to a processing function entity, the processing function entity forwards a processed packet according to the second forwarding policy.

For example, based on the path indicated by the solid line in FIG. 19, when a packet reaches the base station, the base station forwards the packet to the processing function entity 1 according to the first forwarding policy. The processing function entity 1 processes the packet according to a received processing policy, and then forwards a processed packet to the processing function entity 2 according to a received second forwarding policy. The processing function entity 2 processes the packet according to a received processing policy, and then forwards a processed packet to the processing function entity 3 according to a received second forwarding policy. Actions performed by the processing function entity 3 and the processing function entity 4 are similar to those performed by the processing function entity 1 and the processing function entity 2. Therefore, the packet can reach the routing function entity after the packet is processed and forwarded by the processing function entity 1, the processing function entity 2, the processing function entity 3, and the processing function entity 4.

Specifically, when the second node is the base station, after receiving a packet sent by the last processing function entity in the M processing function entities that processes a packet, the base station forwards the packet to the UE. When the second node is the routing function entity, after receiving a packet sent by the last processing function entity in the M processing function entities that processes a packet, the routing function entity forwards the packet to the external network.

In a possible implementation, the at least one processing controller may add the second forwarding policy to the processing policy. In this case, the second forwarding policy may be generated by the at least one processing controller, operation 403 and operation 406 may be omitted. Operation 402 includes: The at least one processing controller sends a corresponding processing policy to each of M processing function entities in N processing function entities. The processing policy includes the second forwarding policy. In addition, the at least one processing controller may include the second forwarding policy and the processing policy in a same message, and send the message to the processing function entity.

In another possible implementation, the first forwarding policy and the second forwarding policy may be the same. In this case, the first forwarding policy and the second forwarding policy may be a forwarding policy generated according to identifiers of nodes on an entire path on which a packet is forwarded.

In this case, the routing controller delivers only the first forwarding policy. Therefore, the routing controller may not have a function of determining, according to each traffic flow identifier, processing logic corresponding to the traffic flow identifier, and the routing controller needs to obtain the identifier of the first processing function entity, to generate the first forwarding policy. A specific obtaining manner includes: The at least one processing controller determines the first processing function entity, and a target processing controller sends the identifier of the first processing function entity to the routing controller. The target processing controller is any one of the at least one processing controller. The routing controller is further configured to receive the identifier of the first processing function entity that is sent by the target processing controller.

Specifically, the first processing function entity may be preconfigured. For example, QoS control processing can be first performed on each packet. In this case, the first processing function entity is a QoS processing entity. The first processing function entity may be determined by means of negotiation by the at least one processing controller.

Implementation 3

Figure 18:
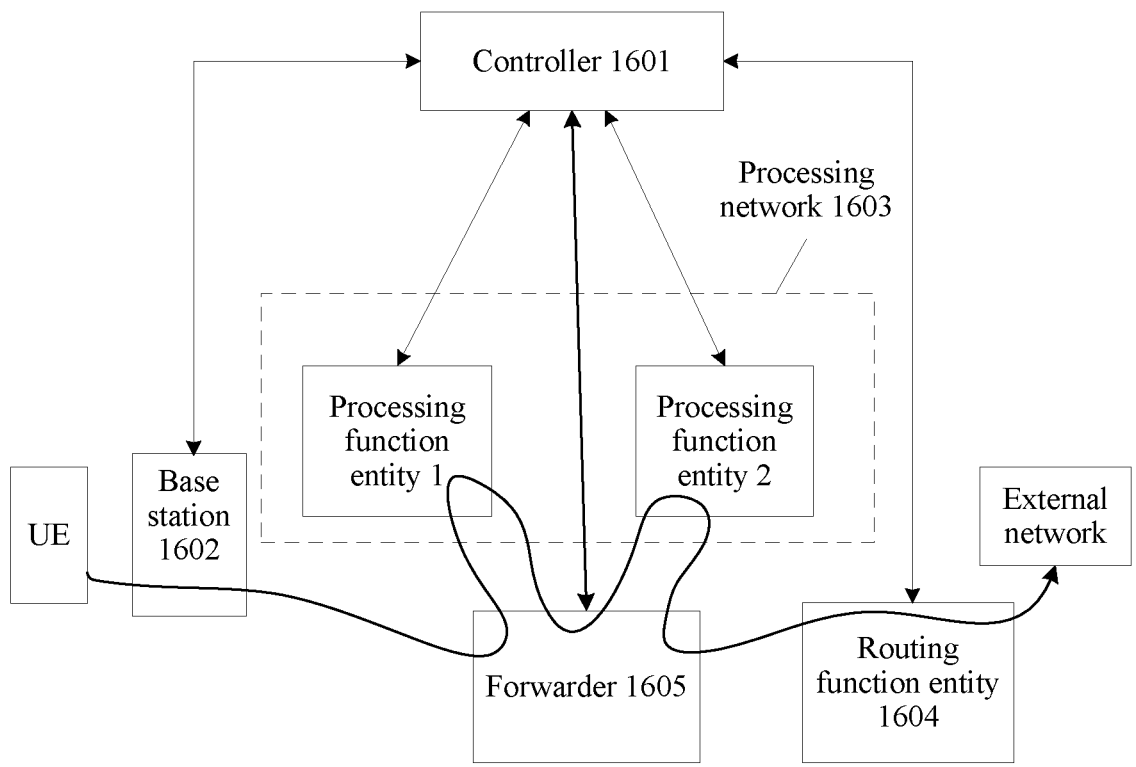
FIG. 18 is a schematic architectural diagram of another network system according to an embodiment of the present disclosure.
Figure 20:
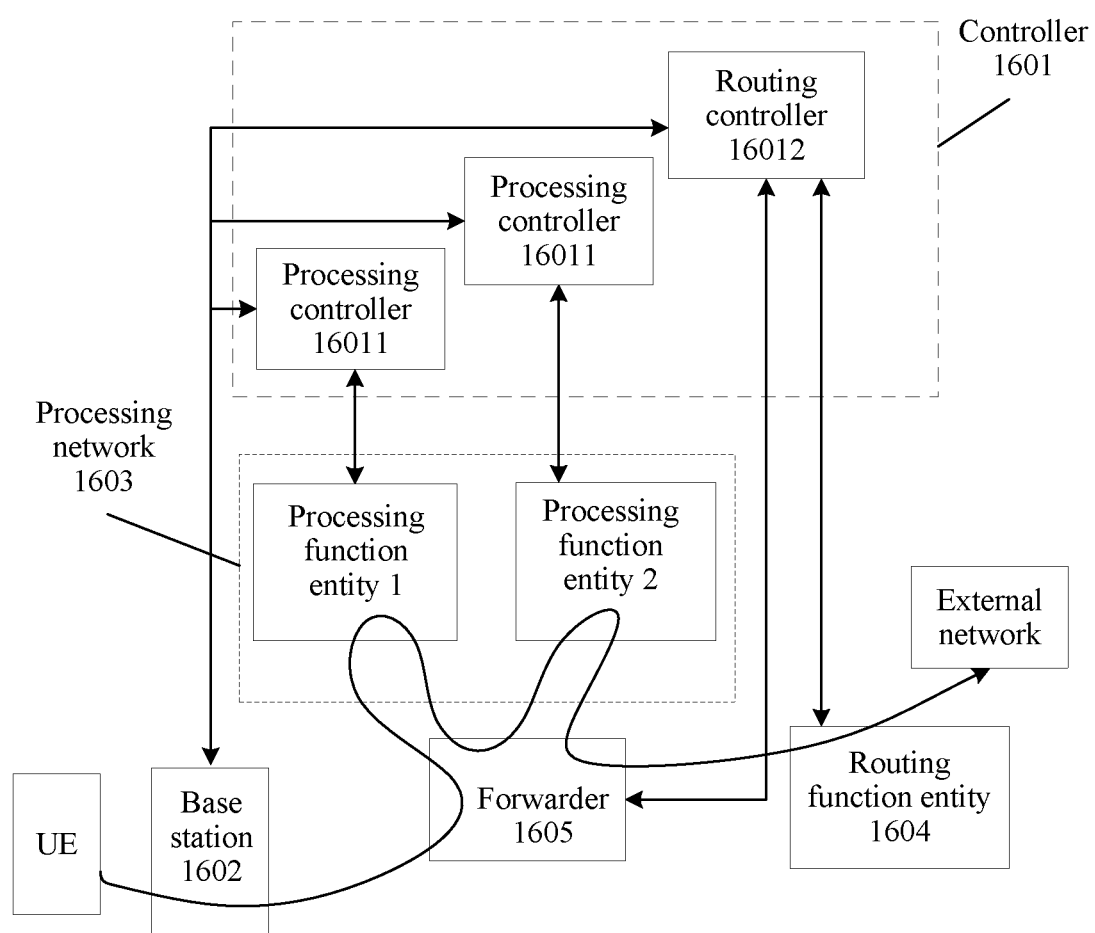
FIG. 20 is a schematic architectural diagram of another network system according to an embodiment of the present disclosure.

On the basis of FIG. 17, a schematic architectural diagram of a network system shown in FIG. 18 further includes a forwarder (FIG. 18 is drawn by using an example of two processing function entities). On the basis of FIG. 19, a schematic architectural diagram of a network system shown in FIG. 20 further includes a forwarder (FIG. 20 is drawn by using an example of two processing function entities and two processing controllers). The implementation may be based on an architecture of the network system shown in FIG. 18 or FIG. 20. When the implementation is based on the architecture of the network system shown in FIG. 18, the network system includes a controller, and operation 501 to operation 503 are all performed by the controller. When the implementation is based on the architecture of the network system shown in FIG. 20, the network system includes a routing controller and at least one processing controller, both operation 501 and operation 503 are performed by the routing controller, and operation 502 is performed by the at least one processing controller.

Figure 5:
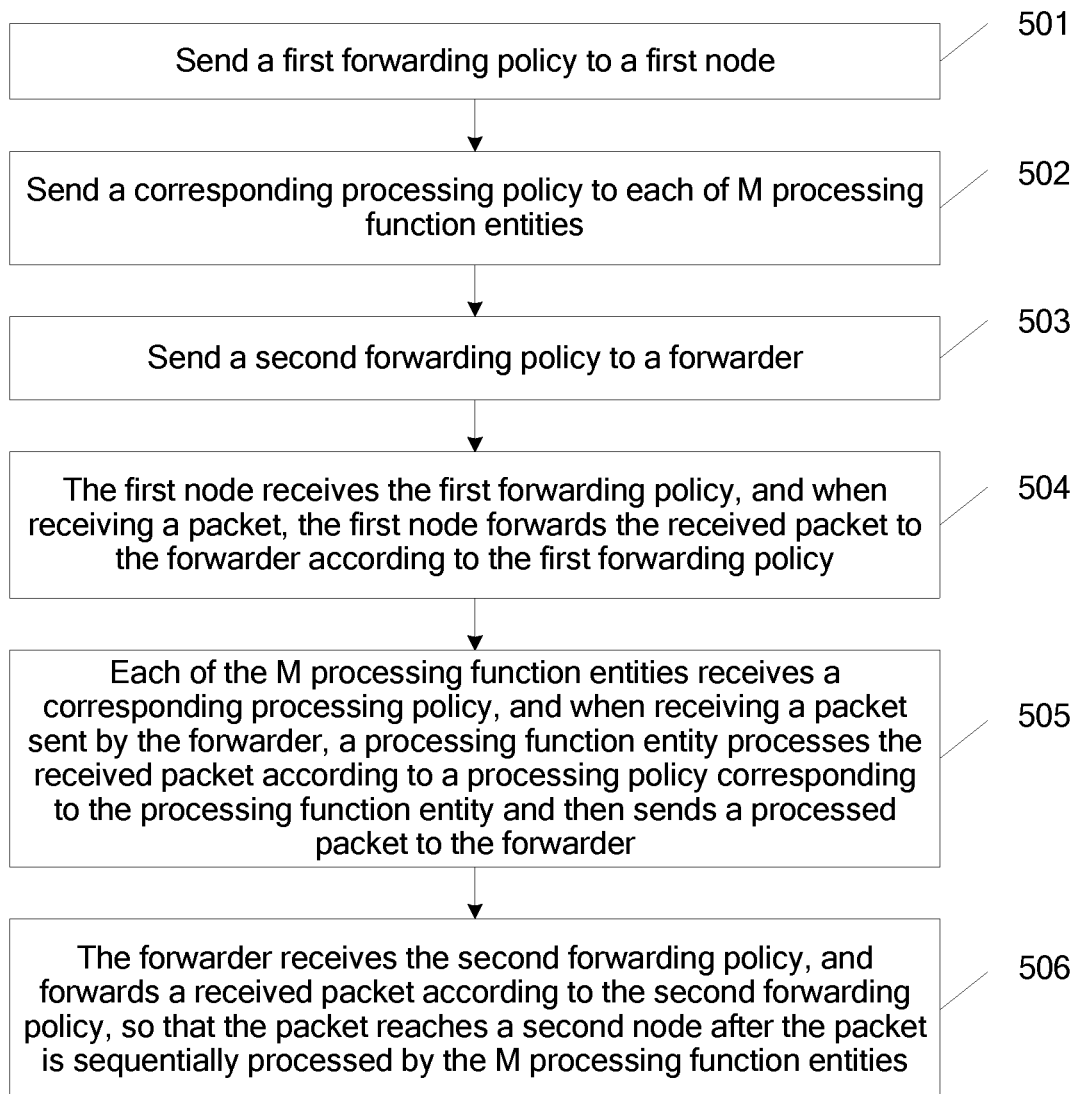
FIG. 5 is a flowchart of another service processing method according to an embodiment of the present disclosure.

As shown in FIG. 5, in specific implementation, the foregoing method includes the following operations.

Operation 501. Send a first forwarding policy to a first node.

The first forwarding policy is used to control the first node to forward a received packet to the forwarder. The first forwarding policy may be generated according to an identifier of the forwarder and a traffic flow identifier. For specific description of the traffic flow identifier, refer to Implementation 1. The identifier of the forwarder may be an IP address, a MAC address, a connection port number, a tunnel identifier, or the like of the forwarder.

It should be noted that, when the implementation is based on the architecture of the network system shown in FIG. 18 (FIG. 20), after determining the traffic flow identifier, the controller (the routing controller) may determine, according to the traffic flow identifier, processing logic corresponding to a packet that carries the traffic flow identifier, that is, a processing function entity that the packet passes through.

Operation 502. Send a corresponding processing policy to each of M processing function entities.

Meanings of the M processing function entities in this implementation and those of M processing function entities in Implementation 4 are the same as meanings of the M processing function entities in Implementation 1.

Specifically, a processing policy corresponding to each processing function entity may be generated according to the traffic flow identifier, and one processing function entity is corresponding to one processing policy. A processing policy sent to a processing function entity is used by the processing function entity to process a received packet according to the processing policy.

Operation 503. Send a second forwarding policy to the forwarder.

Specifically, the second forwarding policy may be generated according to the traffic flow identifier, identifiers of the M processing function entities, and an identifier of a second node. Based on the architecture of the network system shown in FIG. 18 or FIG. 20, an example in which the first node is a base station, and the second node is a routing function entity (it is assumed that an identifier of the routing function entity is B) is used. A sequence of the two processing function entities for processing a packet is: a processing function entity 1 whose identifier is 1—a processing function entity 2 whose identifier is 2. In this case, a form of the second forwarding policy specific to the traffic flow identifier may be 1-2-B. After the forwarder receives the second forwarding policy, when receiving a packet from the processing function entity 1, the forwarder can determine, according to the second forwarding policy, that a next node to which the packet is to be forwarded is a node (that is, the processing function entity 2) whose identifier is 2. A path of the packet is indicated by using a solid line in FIG. 18 and FIG. 20.

It should be noted that, only one form of the second forwarding policy is shown in the present disclosure as an example, but it does not indicate that the second forwarding policy has only the form. For example, when the identifier of the forwarder is C, a form of the second forwarding policy specific to the traffic flow identifier may be further 1-C-2-C-B.

A sequence for performing operation 501, operation 502, and operation 503 is not specifically limited in this embodiment of the present disclosure.

Operation 504. The first node receives the first forwarding policy, and when receiving a packet, the first node forwards the received packet to the forwarder according to the first forwarding policy.

Specifically, the first forwarding policy is generated according to the identifier of the forwarder and the traffic flow identifier. Therefore, when receiving a packet, the first node can determine, according to the first forwarding policy, that a next node to which the packet needs to be forwarded is the forwarder.

Based on the path indicated by the solid line shown in FIG. 18 or FIG. 20, when receiving a packet, the base station forwards the received packet to the forwarder according to the first forwarding policy.

Operation 505. Each of the M processing function entities receives a corresponding processing policy, and when receiving a packet sent by the forwarder, a processing function entity processes the received packet according to a processing policy corresponding to the processing function entity and then sends a processed packet to the forwarder.

Specifically, a next node corresponding to each processing function entity may be preconfigured as the forwarder, or the identifier of the forwarder may be added to the processing policy corresponding to each processing function entity. The added identifier is used to notify the processing function entity of a corresponding next node.

Operation 506. The forwarder receives the second forwarding policy, and forwards a received packet according to the second forwarding policy, so that the packet reaches a second node after the packet is sequentially processed by the M processing function entities.

Specifically, the forwarder may perform the following action according to the second forwarding policy: When receiving a packet sent by a third node, the forwarder forwards the packet to a fourth node. When the third node is the first node, the fourth node is a first processing function entity. When the third node is an $M^{th}$ processing function entity, the fourth node is the second node. When $M≥2$ and the third node is an $m^{th}$ processing function entity, the fourth node is an $(m+1)^{th}$ processing function entity. A sequence of the M processing function entities for processing a packet is from the first processing function entity to the $M^{th}$ processing function entity, $1≤m≤M-1$, $M≤N$, and both m and M are integers.

It should be noted that, when M=1, after receiving a packet sent by the first processing function entity, the forwarder directly forwards the packet to the routing function entity according to the second forwarding policy.

For example, based on the path indicated by the solid line in FIG. 18 or FIG. 20, when a packet reaches the base station, the base station forwards the packet to the forwarder according to the first forwarding policy. The forwarder determines, according to the second forwarding policy, that nodes that the packet passes through are sequentially: a node (that is, the processing function entity 1) whose identifier is 1—a node (that is, the processing function entity 2) whose identifier is 2—a node (that is, the routing function entity) whose identifier is B. Therefore, the forwarder forwards, to the processing function entity 1 according to the second forwarding policy, the received packet sent by the base station. The processing function entity 1 processes, according to a corresponding processing policy, the received packet sent by the forwarder, and then forwards a processed packet to the forwarder. After receiving the packet sent by the processing function entity 1, the forwarder forwards the packet to the processing function entity 2 according to the second forwarding policy. The processing function entity 2 processes, according to a corresponding processing policy, the received packet sent by the forwarder, and then forwards a processed packet to the forwarder. After receiving the packet sent by the processing function entity 2, the forwarder forwards the packet to the routing function entity according to the second forwarding policy.

Specifically, when the second node is the base station, and when receiving a packet sent by the forwarder, the base station forwards the packet to UE. When the second node is the routing function entity, and when receiving a packet sent by the forwarder, the routing function entity forwards the packet to an external network.

It should be noted that, when the implementation is based on the architecture of the network system shown in FIG. 18, the first forwarding policy, the second forwarding policy, and the processing policy are all generated by the controller. When the implementation is based on the architecture of the network system shown in FIG. 20, and when the network system has only one processing controller, operation 502 includes: The processing controller sends a corresponding processing policy to each of the M processing function entities in N processing function entities. When the network system has N processing controllers, operation 502 includes: M processing controllers in the N processing controllers send a corresponding processing policy to each of the M processing function entities in the corresponding N processing function entities. One processing controller is corresponding to one processing function entity. Correspondingly, the first forwarding policy and the second forwarding policy are generated by the routing controller, and the processing policy is generated by the at least one processing controller.

In a possible implementation, the first forwarding policy and the second forwarding policy may be the same. In this case, the first forwarding policy and the second forwarding policy may be a forwarding policy generated according to identifiers of nodes on an entire path on which a packet is forwarded.

In Implementation 3, the forwarder is added in the network system. Compared with Implementation 1, the controller or the routing controller does not need to send the second forwarding policy to each processing function entity any longer. Therefore, a quantity of pieces of control signaling may be decreased.

In the implementation, it should be noted that, the base station may include multiple first forwarding policies corresponding to multiple traffic flow identifiers. One traffic flow identifier is corresponding to one first forwarding policy. When receiving a packet, the base station first determines, according to a traffic flow identifier carried in the packet, a first forwarding policy corresponding to the traffic flow identifier, and then forwards the packet according to the first forwarding policy. Actions performed by the processing function entity, the forwarder, and the routing function entity are similar to those performed by the base station. Therefore, the first forwarding policy, the second forwarding policy, and the processing policy all include a traffic flow identifier.

Implementation 4

The implementation may be based on the architecture of the network system shown in FIG. 17 or FIG. 19. When the implementation is based on the architecture of the network system shown in FIG. 17, the network system includes a controller, and operation 601 to operation 603 are all performed by the controller. When the implementation is based on the architecture of the network system shown in FIG. 19, the network system includes a routing controller and at least one processing controller, operation 601 is performed by the at least one processing controller, and operation 602 and operation 603 are performed by the routing controller.

Figure 6:
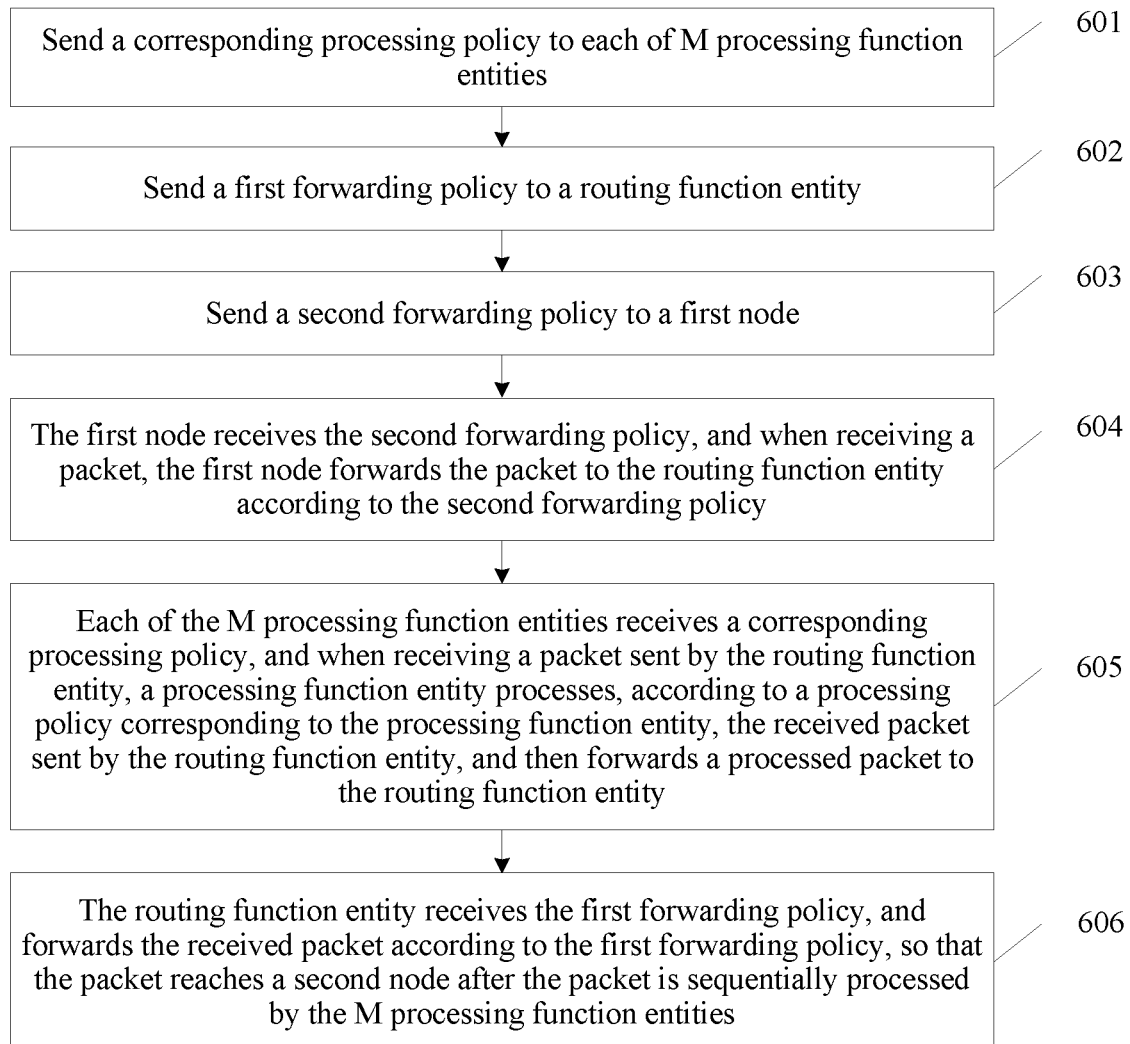
FIG. 6 is a flowchart of another service processing method according to an embodiment of the present disclosure.

As shown in FIG. 6, in specific implementation, the foregoing method includes the following operations.

Operation 601. Send a corresponding processing policy to each of M processing function entities.

Specifically, a processing policy corresponding to each processing function entity may be generated according to a traffic flow identifier, and one processing function entity is corresponding to one processing policy. A processing policy sent to a processing function entity is used by the processing function entity to process a received packet according to the processing policy.

Operation 602. Send a first forwarding policy to a routing function entity.

Specifically, when the first node is a base station, the first forwarding policy may be generated according to the traffic flow identifier and identifiers of the M processing function entities. When the first node is a routing function entity, the first forwarding policy may be generated according to the traffic flow identifier, the identifiers of the M processing function entities, and an identifier of a second node. Based on the architecture of the network system shown in FIG. 17 or FIG. 19, an example in which the first node is the routing function entity, and the second node is the base station (it is assumed that an identifier of the base station is A) is used. A sequence of two processing function entities for processing a packet is: a processing function entity 2 whose identifier is 2—a processing function entity 1 whose identifier is 1. In this case, a form of the first forwarding policy specific to the traffic flow identifier may be 2-1-A. A path of the packet is indicated by using a dashed line in FIG. 17 and FIG. 19.

Operation 603. Send a second forwarding policy to a first node.

The second forwarding policy may be generated according to an identifier of the routing function entity and the traffic flow identifier. For specific description of the traffic flow identifier, refer to Implementation 1. The identifier of the routing function entity may be an IP address, a MAC address, a connection port number, a tunnel identifier, or the like of the routing function entity.

It should be noted that, when the implementation is based on the architecture of the network system shown in FIG. 17 (FIG. 19), after determining the traffic flow identifier, the controller (the routing controller) may determine, according to the traffic flow identifier, processing logic corresponding to a packet that carries the traffic flow identifier, that is, a processing function entity that the packet passes through.

A sequence for performing operation 601, operation 602, and operation 603 is not specifically limited in this embodiment of the present disclosure.

Operation 604. The first node receives the second forwarding policy, and when receiving a packet, the first node forwards the packet to the routing function entity according to the second forwarding policy.

Operation 605. Each of the M processing function entities receives a corresponding processing policy, and when receiving a packet sent by the routing function entity, a processing function entity processes, according to a processing policy corresponding to the processing function entity, the received packet sent by the routing function entity, and then forwards a processed packet to the routing function entity.

Specifically, a next node corresponding to each processing function entity may be preconfigured as the routing function entity, or the identifier of the routing function entity may be added to the processing policy corresponding to each processing function entity. The added identifier is used to notify the processing function entity of a corresponding next node.

Operation 606. The routing function entity receives the first forwarding policy, and forwards the received packet according to the first forwarding policy, so that the packet reaches a second node after the packet is sequentially processed by the M processing function entities.

Specifically, the routing function entity performs the following action according to the first forwarding policy: When receiving a packet sent by a third node, the routing function entity forwards the packet to a fourth node. When the third node is the base station, the fourth node is a first processing function entity. When M≥2 and the third node is an $m^{th}$ processing function entity, the fourth node is an $(m+1)^{th}$ processing function entity. Alternatively, when the third node is an external network, the fourth node is a first processing function entity. When M≥2 and the third node is an $m^{th}$ processing function entity, the fourth node is an $(m+1)^{th}$ processing function entity. When the third node is an $M^{th}$ processing function entity, the fourth node is the base station. A sequence of the M processing function entities for processing a packet is sequentially from the first processing function entity to the $M^{th}$ processing function entity, $1 \leq m \leq M-1$, $M \leq N$, and both m and M are integers.

It should be noted that, when the first node is the base station, the base station needs to forward a packet to the routing function entity, so that the routing function entity forwards the packet according to the first forwarding policy. Therefore, the routing controller needs to send the second forwarding policy to the base station. However, when the first node is the routing function entity, a packet sent by the external network directly reaches the routing function entity. Therefore, the routing function entity can directly forward the packet according to the first forwarding policy. Therefore, when the first node is the routing function entity, operation 603 and operation 604 may be omitted.

Based on the path, of a packet, indicated by the dashed line in FIG. 17 (FIG. 19), when a packet reaches the routing function entity, the routing function entity determines, according to the first forwarding policy, that nodes that the packet passes through are sequentially: a node (that is, the processing function entity 2) whose identifier is 2—a node (that is, the processing function entity 1) whose identifier is 1—a node (that is, the base station) whose identifier is A. Therefore, the routing function entity forwards the packet to the processing function entity 2 according to the first forwarding policy. The processing function entity 2 processes, according to a corresponding processing policy, the received packet sent by the routing function entity, and then sends a processed packet to the routing function entity. After receiving the packet sent by the processing function entity 2, the routing function entity forwards the packet to the processing function entity 1 according to the first forwarding policy. The processing function entity 1 processes, according to a corresponding processing policy, the received packet sent by the routing function entity, and then sends a processed packet to the routing function entity. After receiving the packet sent by the processing function entity 1, the routing function entity forwards the packet to the base station.

Specifically, when the second node is the base station, and when receiving a packet sent by the routing function entity, the base station forwards the packet to UE. When the second node is the routing function entity, and when receiving a packet sent by the last processing function entity in the M processing function entities that processes a packet, the routing function entity forwards the packet to the external network.

It should be noted that, when the implementation is based on the architecture of the network system shown in FIG. 17, the first forwarding policy, the second forwarding policy, and the processing policy are all generated by the controller.

When the implementation is based on the architecture of the network system shown in FIG. 19, and when the network system has only one processing controller, operation 601 includes: The processing controller sends a corresponding processing policy to each of the M processing function entities in N processing function entities. When the network system has N processing controllers, operation 601 includes: M processing controllers in the N processing controllers send a corresponding processing policy to each of the M processing function entities in the corresponding N processing function entities. One processing controller is corresponding to one processing function entity. Correspondingly, the first forwarding policy and the second forwarding policy are generated by the routing controller, and processing policies corresponding to the N processing function entities are generated by the at least one processing controller.

In a possible implementation, the first forwarding policy and the second forwarding policy may be the same. In this case, the first forwarding policy and the second forwarding policy may be a forwarding policy generated according to identifiers of nodes on an entire path on which a packet is forwarded.

In Implementation 4, functions of the forwarder in Implementation 3 are integrated into the routing function entity. Compared with Implementation 1 and Implementation 2, when the forwarder is not added, the controller or the routing controller does not need to send the second forwarding policy to each processing function entity any longer. Therefore, a quantity of pieces of control signaling is decreased.

It should be noted that, the routing function entity may include multiple first forwarding policies corresponding to multiple traffic flow identifiers. One traffic flow identifier is corresponding to one first forwarding policy. When receiving a packet, the routing function entity first determines, according to a traffic flow identifier carried in the packet, a first forwarding policy corresponding to the traffic flow identifier, and then forwards the packet according to the first forwarding policy. Actions performed by the processing function entity and the base station are similar to those performed by the routing function entity. Therefore, the first forwarding policy, the second forwarding policy, and the processing policy all include a traffic flow identifier.

It should be emphasized that, in all processes of describing the four implementations, an example in which the forwarding policy and the processing policy are specific to an uplink packet or a downlink packet is used for describing the method provided in the present disclosure. Actually, in specific implementation, after the traffic flow identifier is determined, a forwarding policy and a processing policy may be generated for the downlink packet according to a downlink preconfiguration policy, a forwarding policy and a processing policy may be generated for the uplink packet according to an uplink preconfiguration policy, and these policies are delivered to a corresponding device.

Embodiment 1

In this embodiment, an example in which a packet (that is, an uplink packet) sent by UE needs to be processed by a processing function entity 1 and a processing function entity 2, and the UE sends a service request before sending the packet is used for describing Implementation 1 and Implementation 2. For related explanation in this embodiment, refer to description in Implementation 1 and Implementation 2.

A method provided in this embodiment may be applied to the architecture of the network system shown in FIG. 17 or FIG. 19. When this embodiment is based on the architecture of the network system shown in FIG. 17, operation 701 to operation 704 are all performed by a controller. When this embodiment is based on the architecture of the network system shown in FIG. 19, operation 701 is performed by a routing controller and a processing controller (an example in which the network system includes a processing controller and a routing controller is used in this embodiment), operation 702 and operation 703 are performed by the routing controller, and operation 704 is performed by the processing controller.

Figure 7A:
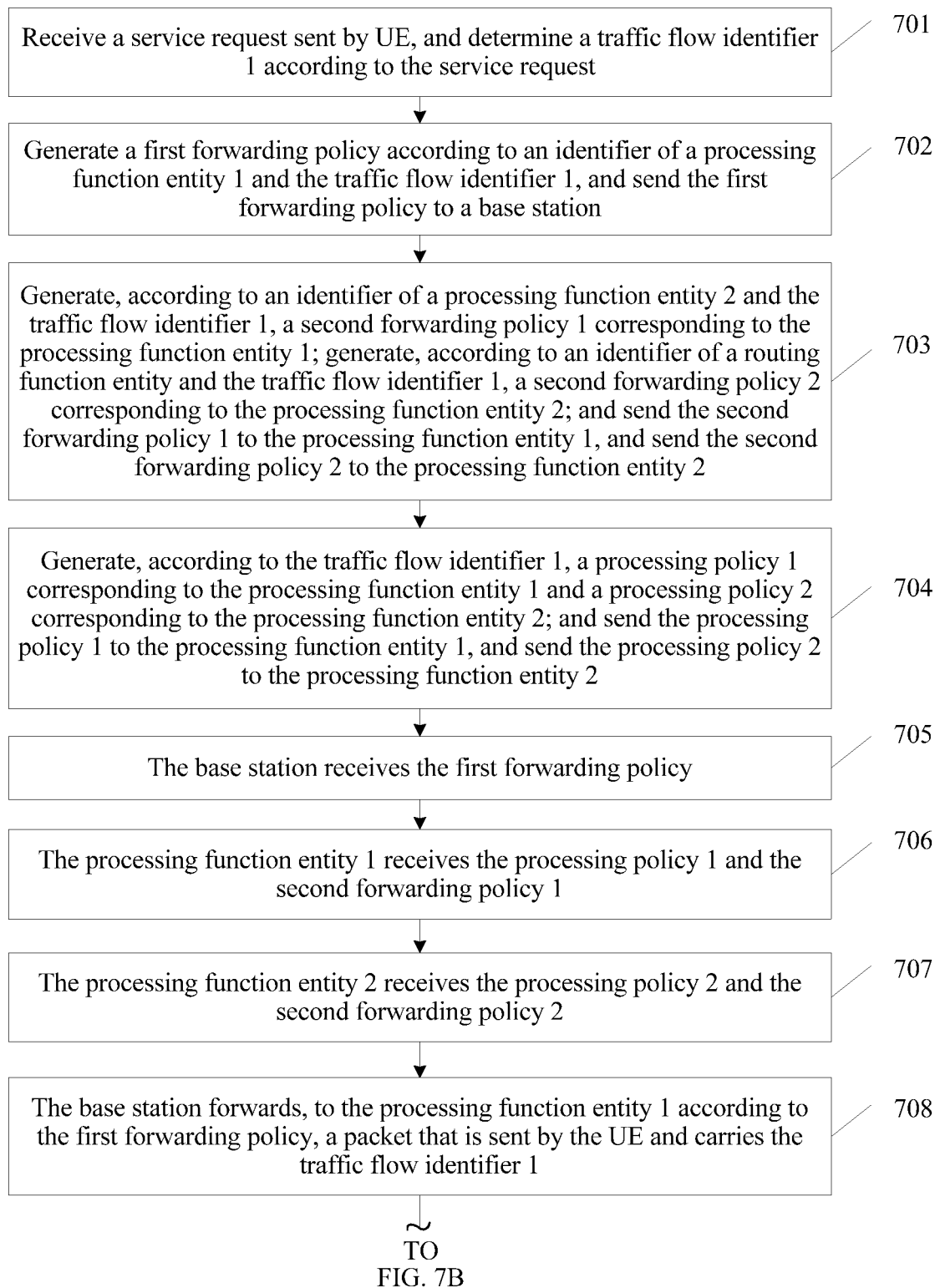

As shown in FIG. 7A and FIG. 7B, in specific implementation, the foregoing method includes the following operations.

Operation 701. Receive a service request sent by the UE, and determine a traffic flow identifier 1 according to the service request.

Specifically, the service request includes the traffic flow identifier 1. The traffic flow identifier 1 may be an IP address of the UE, IP quintuplets of a traffic flow, or the like.

Operation 702. Generate a first forwarding policy according to an identifier of the processing function entity 1 and the traffic flow identifier 1, and send the first forwarding policy to a base station.

An identifier of a processing function entity may be an IP address, a MAC address, a connection port number, a tunnel identifier, or the like of the processing function entity. The processing function entity 1 is the first one that processes a packet carrying the traffic flow identifier 1.

Operation 703. Generate, according to an identifier of the processing function entity 2 and the traffic flow identifier 1, a second forwarding policy 1 corresponding to the processing function entity 1; generate, according to an identifier of a routing function entity and the traffic flow identifier 1, a second forwarding policy 2 corresponding to the processing function entity 2; and send the second forwarding policy 1 to the processing function entity 1, and send the second forwarding policy 2 to the processing function entity 2.

For example, it is assumed that the identifier of the routing function entity is B, the identifier of the processing function entity 1 is 1, and the identifier of the processing function entity 2 is 2. In this case, the second forwarding policy 1 includes the traffic flow identifier 1 and the identifier 2, and the second forwarding policy 2 includes the traffic flow identifier 1 and the identifier B.

Operation 704. Generate, according to the traffic flow identifier 1, a processing policy 1 corresponding to the processing function entity 1 and a processing policy 2 corresponding to the processing function entity 2; and send the processing policy 1 to the processing function entity 1, and send the processing policy 2 to the processing function entity 2.

It should be noted that, the first forwarding policy, the second forwarding policy, and the processing policy generated in Embodiment 1 are all specific to the traffic flow identifier 1. When traffic flow identifiers are different, generated first forwarding policies, second forwarding policies, and processing policies may also be different.

A sequence of performing operation 702, operation 703, and operation 704 is not limited.

Operation 705. The base station receives the first forwarding policy.

Operation 706. The processing function entity 1 receives the processing policy 1 and the second forwarding policy 1.

Operation 707. The processing function entity 2 receives the processing policy 2 and the second forwarding policy 2.

A sequence of performing operation 705, operation 706, and operation 707 is not limited.

When a packet that is sent by the UE and carries the traffic flow identifier 1 reaches the base station, a procedure for processing and forwarding the packet is as follows.

Operation 708. The base station forwards, to the processing function entity 1 according to the first forwarding policy, a packet that is sent by the UE and carries the traffic flow identifier 1.

Operation 709. After receiving the packet that is sent by the base station and carries the traffic flow identifier 1, the processing function entity 1 processes the packet according to the processing policy 1, and forwards, to the processing function entity 2 according to the second forwarding policy 1, a processed packet that carries the traffic flow identifier 1.

Operation 710. After receiving the packet that is sent by the processing function entity 1 and carries the traffic flow identifier 1, the processing function entity 2 processes, according to the processing policy 2, the packet that carries the traffic flow identifier 1, and forwards, to the routing function entity according to the second forwarding policy 2, a processed packet that carries the traffic flow identifier 1.

Operation 711. After receiving the packet that is sent by the processing function entity 2 and carries the traffic flow identifier 1, the routing function entity forwards the packet to an external network.

According to the method provided in this embodiment of the present disclosure, a forwarding plane is divided into a processing network (including N processing function entities) and a routing function entity. The processing network is configured to process a packet, and therefore, the processing network includes a computing resource. The routing function entity serves as an anchor point of an IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

Embodiment 2

In this embodiment, an example in which a packet sent by UE needs to be processed by a processing function entity 1 and a processing function entity 2, and the UE sends a service request before sending the packet is used for describing Implementation 3. For related explanation in this embodiment, refer to description in Implementation 3.

A method provided in this embodiment may be applied to the architecture of the network system shown in FIG. 18 or FIG. 20. When this embodiment is based on the architecture of the network system shown in FIG. 18, operation 801 to operation 804 are all performed by a controller. When this embodiment is based on the architecture of the network system shown in FIG. 20, operation 801 is performed by a routing controller and a processing controller (an example in which the network system includes a processing controller and a routing controller is used in this embodiment), operation 802 and operation 803 are performed by the routing controller, and operation 804 is performed by the processing controller.

Figure 8A:
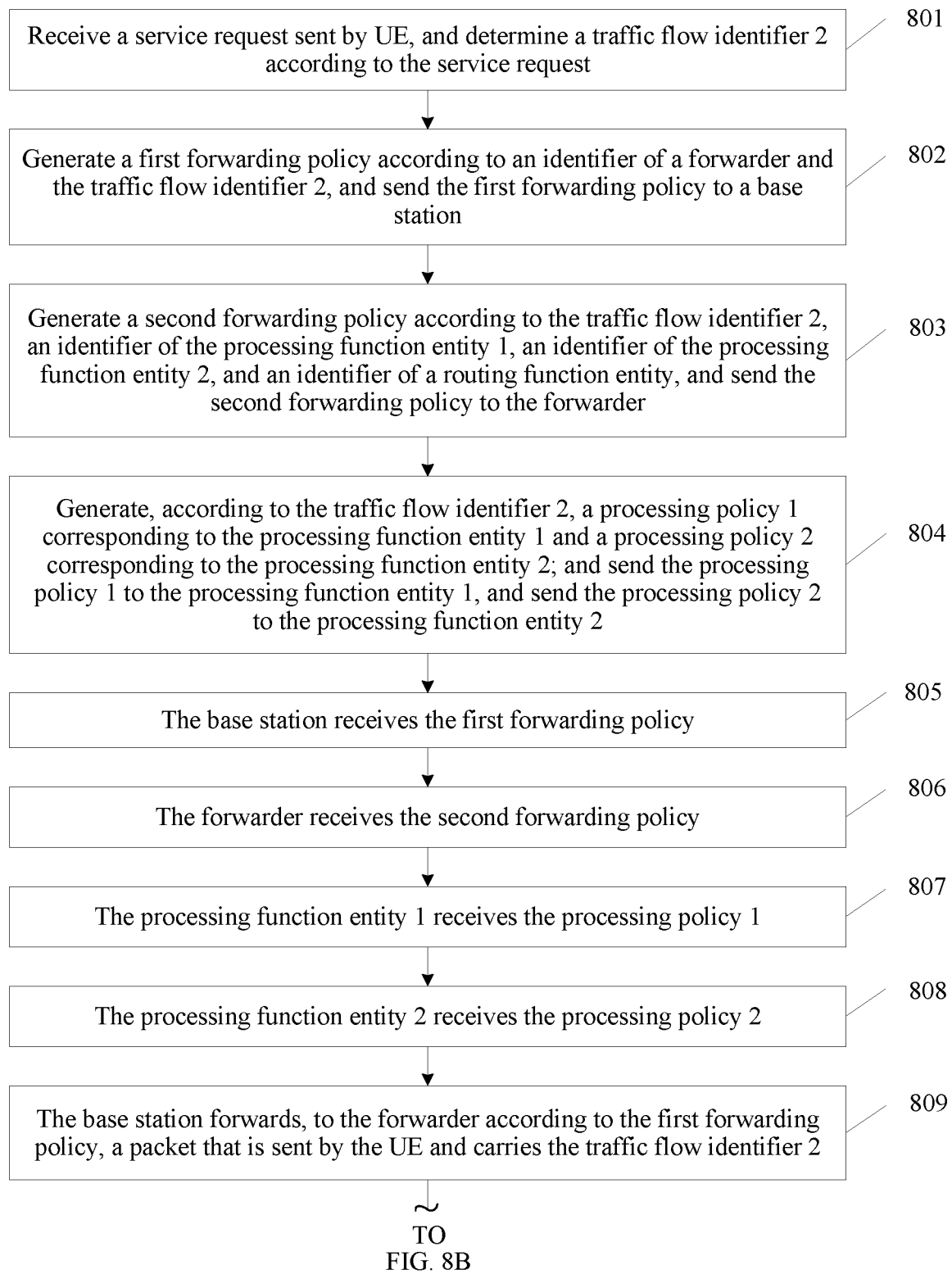

As shown in FIG. 8A and FIG. 8B, in specific implementation, the foregoing method includes the following operations.

Operation 801. Receive a service request sent by the UE, and determine a traffic flow identifier 2 according to the service request.

Specifically, the service request includes the traffic flow identifier 2. The traffic flow identifier 2 may be an IP address of the UE, IP quintuplets of a traffic flow, or the like.

Operation 802. Generate a first forwarding policy according to an identifier of a forwarder and the traffic flow identifier 2, and send the first forwarding policy to a base station.

The identifier of the forwarder may be an IP address, a MAC address, a connection port number, a tunnel identifier, or the like of the forwarder.

Operation 803. Generate a second forwarding policy according to the traffic flow identifier 2, an identifier of the processing function entity 1, an identifier of the processing function entity 2, and an identifier of a routing function entity, and send the second forwarding policy to the forwarder.

It is assumed that the identifier of the routing function entity is B, the identifier of the processing function entity 1 is 1, and the identifier of the processing function entity 2 is 2. In this case, a form of the second forwarding policy specific to the traffic flow identifier 2 may be 1-2-B.

Operation 804. Generate, according to the traffic flow identifier 2, a processing policy 1 corresponding to the processing function entity 1 and a processing policy 2 corresponding to the processing function entity 2; and send the processing policy 1 to the processing function entity 1, and send the processing policy 2 to the processing function entity 2.

It should be noted that, the first forwarding policy, the second forwarding policy, and the processing policy generated in Embodiment 2 are all specific to the traffic flow identifier 2.

A sequence of performing operation 802, operation 803, and operation 804 is not limited.

Operation 805. The base station receives the first forwarding policy.

Operation 806. The forwarder receives the second forwarding policy.

Operation 807. The processing function entity 1 receives the processing policy 1.

Operation 808. The processing function entity 2 receives the processing policy 2.

A sequence of performing operation 805, operation 806, operation 807, and operation 808 is not limited.

When a packet that is sent by the UE and carries the traffic flow identifier 2 reaches the base station, a procedure for processing and forwarding the packet is as follows.

Operation 809. The base station forwards, to the forwarder according to the first forwarding policy, a packet that is sent by the UE and carries the traffic flow identifier 2.

Operation 810. The forwarder forwards, to the processing function entity 1 according to the second forwarding policy, the packet that is sent by the base station and carries the traffic flow identifier 2.

Operation 811. After receiving the packet that is sent by the forwarder and carries the traffic flow identifier 2, the processing function entity 1 processes the packet according to the processing policy 1, and then forwards a processed packet to the forwarder.

Specifically, a next node corresponding to each processing function entity may be preconfigured as the forwarder.

Operation 812. The forwarder forwards, to the processing function entity 2 according to the second forwarding policy, the packet that is sent by the processing function entity 1 and carries the traffic flow identifier 2.

Operation 813. After receiving the packet that is sent by the forwarder and carries the traffic flow identifier 2, the processing function entity 2 processes the packet according to the processing policy 2, and then forwards a processed packet to the forwarder.

Operation 814. The forwarder forwards, to the routing function entity according to the second forwarding policy, the packet that is sent by the processing function entity 2 and carries the traffic flow identifier 2.

Operation 815. After receiving the packet that is sent by the forwarder and carries the traffic flow identifier 2, the routing function entity forwards the packet to an external network.

In Embodiment 1 and Embodiment 2, it should be noted that, the base station may include multiple first forwarding policies corresponding to multiple traffic flow identifiers. One traffic flow identifier is corresponding to one first forwarding policy. When receiving a packet, the base station first determines, according to a traffic flow identifier carried in the packet, a first forwarding policy corresponding to the traffic flow identifier, and then forwards the packet according to the first forwarding policy. Actions performed by the processing function entity, the forwarder, and the routing function entity are similar to those performed by the base station. Therefore, the first forwarding policy, the second forwarding policy, and the processing policy all include a traffic flow identifier.

According to the method provided in this embodiment of the present disclosure, a forwarding plane is divided into a processing network (including N processing function entities) and a routing function entity. The processing network is configured to process a packet, and therefore, the processing network includes a computing resource. The routing function entity serves as an anchor point of an IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

Embodiment 3

In this embodiment, an example in which a packet (that is, a downlink packet) sent by an external network needs to be processed by a processing function entity 1 and a processing function entity 2, and UE sends a service request before sending a packet is used for describing Implementation 4. For related explanation in this embodiment, refer to description in Implementation 4.

A method provided in this embodiment may be applied to the architecture of the network system shown in FIG. 17 or FIG. 19. When this embodiment is based on the architecture of the network system shown in FIG. 17, operation 901 to operation 903 are all performed by a controller. When this embodiment is based on the architecture of the network system shown in FIG. 19, operation 901 is performed by a routing controller and a processing controller (an example in which the network system includes a processing controller and a routing controller is used in this embodiment), operation 902 is performed by the routing controller, and operation 903 is performed by the processing controller.

Figure 9A:
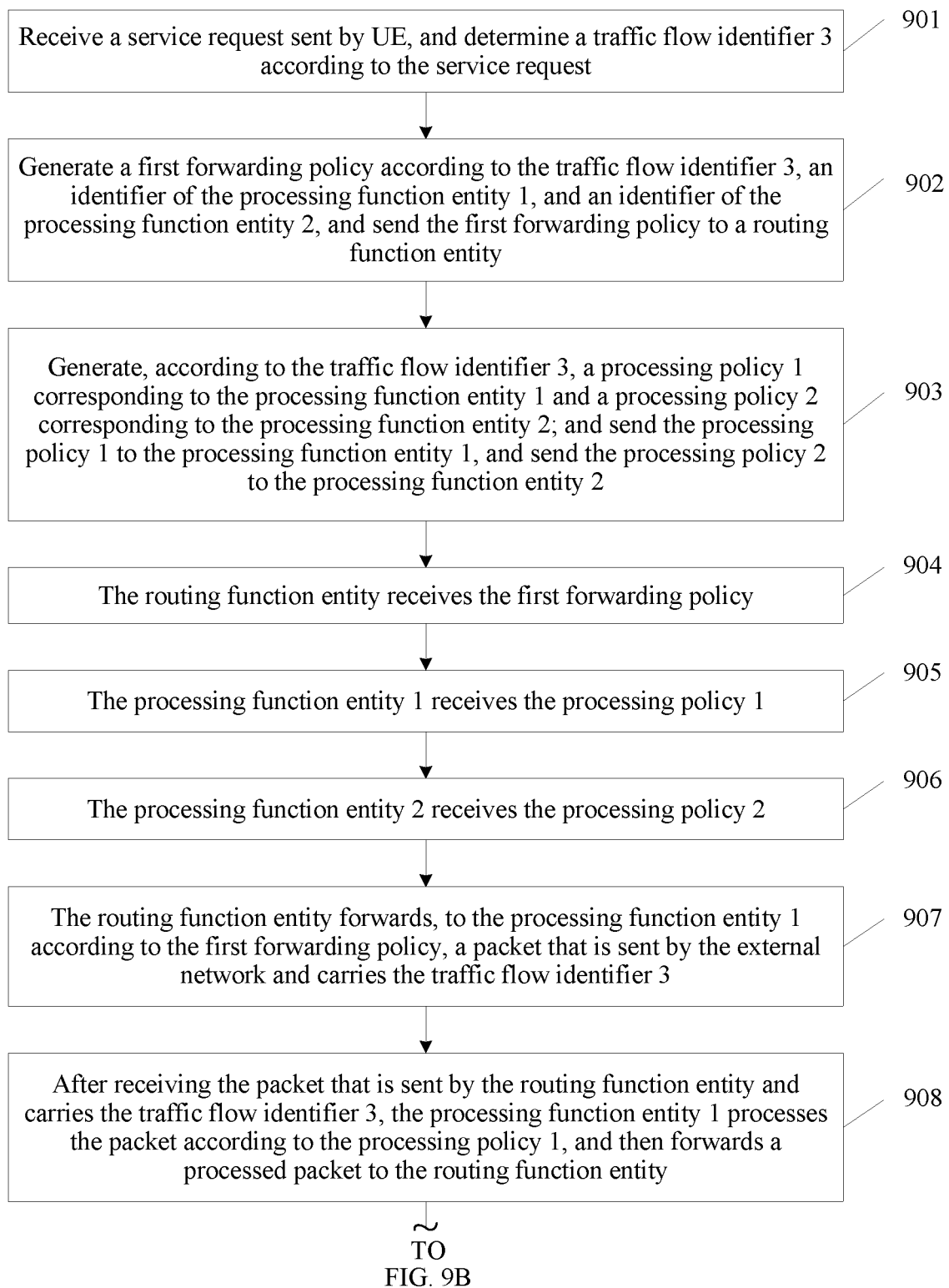

As shown in FIG. 9A and FIG. 9B, in specific implementation, the foregoing method includes the following operations.

Operation 901. Receive a service request sent by the UE, and determine a traffic flow identifier 3 according to the service request.

Specifically, the service request includes the traffic flow identifier 3. The traffic flow identifier 3 may be an IP address of the UE, IP quintuplets of a traffic flow, or the like.

Operation 902. Generate a first forwarding policy according to the traffic flow identifier 3, an identifier of the processing function entity 1, an identifier of the processing function entity 2, and an identifier of a base station, and send the first forwarding policy to a routing function entity.

It is assumed that the identifier of the base station is A, the identifier of the processing function entity 1 is 1, and the identifier of the processing function entity 2 is 2. In this case, a form of the first forwarding policy specific to the traffic flow identifier 3 may be 1-2-A.

Operation 903. Generate, according to the traffic flow identifier 3, a processing policy 1 corresponding to the processing function entity 1 and a processing policy 2 corresponding to the processing function entity 2; and send the processing policy 1 to the processing function entity 1, and send the processing policy 2 to the processing function entity 2.

A sequence of performing operation 901, operation 902, and operation 903 is not limited.

Operation 904. The routing function entity receives the first forwarding policy.

Operation 905. The processing function entity 1 receives the processing policy 1.

Operation 906. The processing function entity 2 receives the processing policy 2.

A sequence of performing operation 904, operation 905, and operation 906 is not limited.

When a packet that is sent by the external network and carries the traffic flow identifier 3 reaches the routing function entity, a procedure for processing and forwarding the packet is as follows.

Operation 907. The routing function entity forwards, to the processing function entity 1 according to the first forwarding policy, a packet that is sent by the external network and carries the traffic flow identifier 3.

Operation 908. After receiving the packet that is sent by the routing function entity and carries the traffic flow identifier 3, the processing function entity 1 processes the packet according to the processing policy 1, and then forwards a processed packet to the routing function entity.

Specifically, a next node corresponding to each processing function entity may be preconfigured as the routing function entity.

Operation 909. The routing function entity forwards, to the processing function entity 2 according to the first forwarding policy, the packet that is sent by the processing function entity 1 and carries the traffic flow identifier 3.

Operation 910. After receiving the packet that is sent by the routing function entity and carries the traffic flow identifier 3, the processing function entity 2 processes the packet according to the processing policy 2, and then forwards a processed packet to the routing function entity.

Operation 911. The routing function entity forwards, to the base station according to the first forwarding policy, the packet that is sent by the processing function entity 2 and carries the traffic flow identifier 3.

Operation 912. After receiving the packet that is sent by the routing function entity and carries the traffic flow identifier 3, the base station forwards the packet to the UE.

It should be noted that, the routing function entity may include multiple first forwarding policies corresponding to multiple traffic flow identifiers. One traffic flow identifier is corresponding to one first forwarding policy. When receiving a packet, the routing function entity first determines, according to a traffic flow identifier carried in the packet, a first forwarding policy corresponding to the traffic flow identifier, and then forwards the packet according to the first forwarding policy. Actions performed by the processing function entity are similar to those performed by the routing function entity. Therefore, the first forwarding policy and the processing policy both include a traffic flow identifier.

According to the method provided in this embodiment of the present disclosure, a forwarding plane is divided into a processing network (including N processing function entities) and a routing function entity. The processing network is configured to process a packet, and therefore, the processing network includes a computing resource. The routing function entity serves as an anchor point of an IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

Embodiment 2

Figure 1:
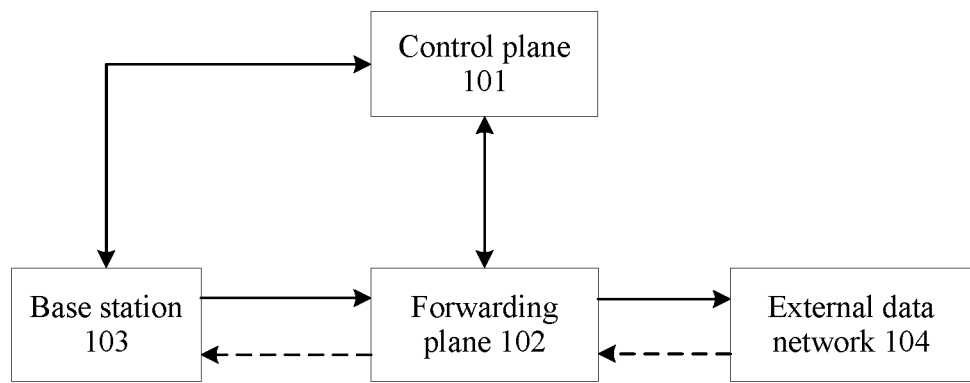
FIG. 1 is a schematic diagram of a network architecture in which control and forwarding functions of a mobile gateway in an EPC network are separated.

This embodiment of the present disclosure provides a controller 100, configured to perform the method shown in FIG. 1. As shown in FIG. 10, the controller 100 includes:

a control unit 1001, configured to: control a first node to send a received packet to a processing network, and control the processing network to process the packet and then send a processed packet to a second node. The first node is a base station or a network element connected to the base station, and the second node is a routing function entity; or the first node is the routing function entity, and the second node is the base station or a network element connected to the base station. The routing function entity is an anchor point of an Internet Protocol IP address of a user.

In one embodiment, the processing network includes at least one processing function entity.

In one embodiment, as shown in FIG. 10, the controller 100 further includes:

a sending unit 1002, configured to send a first forwarding policy to the first node. The first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier.

In one embodiment, the sending unit 1002 is further configured to send a corresponding processing policy and a second forwarding policy to one or more processing function entities in the processing network. The processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier.

In one embodiment, as shown in FIG. 10, the controller 100 further includes:

a sending unit 1002, configured to send a first forwarding policy to the first node. The first forwarding policy is used to control the first node to forward the received packet to a forwarder, so that the forwarder forwards the packet to a first processing function entity. The first processing function entity is a processing function entity in the processing network.

In one embodiment, the sending unit 1002 is further configured to send a corresponding processing policy to one or more processing function entities in the processing network. The processing policy is used to control a processing function entity that receives the processing policy to process, according to the processing policy, the received packet sent by the forwarder, and then send the processed packet to the forwarder.

The sending unit 1002 is further configured to send a second forwarding policy to the forwarder. The second forwarding policy is used to control the forwarder to forward the received packet according to the second forwarding policy, so that the packet reaches the second node after the packet is sequentially processed by the one or more processing function entities.

In one embodiment, as shown in FIG. 10, the controller 100 further includes:

a sending unit 1002, configured to send a corresponding processing policy to one or more processing function entities in the processing network. The processing policy is used to control a processing function entity that receives the processing policy to process, according to the processing policy, the received packet sent by the routing function entity, and then send the processed packet to the routing function entity.

The sending unit 1002 is further configured to send a first forwarding policy to the routing function entity. The first forwarding policy is used to control the routing function entity to forward the received packet according to the first forwarding policy, so that the packet reaches the second node after the packet is sequentially processed by the one or more processing function entities.

In one embodiment, when the first node is the base station or the network element connected to the base station, the sending unit 1002 is further configured to send a second forwarding policy to the first node. The second forwarding policy is used to control the first node to forward the received packet to the routing function entity, so that the routing function entity forwards the packet to a first processing function entity according to the first forwarding policy. The first processing function entity is a processing function entity in the processing network.

Figure 11:
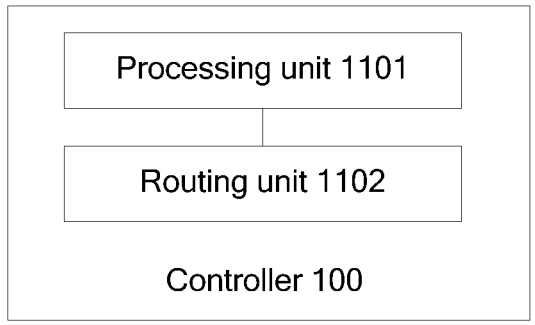
FIG. 11 is a schematic structural diagram of another controller according to an embodiment of the present disclosure.

In one embodiment, as shown in FIG. 11, the controller 100 includes at least one processing unit 1101 and a routing unit 1102.

The routing unit 1102 is configured to send the first forwarding policy and the second forwarding policy.

The at least one processing unit 1101 is configured to send the processing policy.

In one embodiment, as shown in FIG. 11, the controller 100 includes at least one processing unit 1101 and a routing unit 1102.

The routing unit 1102 is configured to: send the first forwarding policy to the first node, and send the corresponding second forwarding policy to the one or more processing function entities.

The at least one processing unit 1101 is configured to send the corresponding processing policy to the one or more processing function entities.

In one embodiment, the routing unit 1102 is further configured to determine the traffic flow identifier, and send the traffic flow identifier to the at least one processing unit 1101.

The at least one processing unit 1101 is further configured to: receive the traffic flow identifier sent by the routing unit 1102, and generate, according to the traffic flow identifier, the processing policy corresponding to the one or more processing function entities.

In one embodiment, the at least one processing unit 1101 is further configured to determine the first processing function entity, and a target processing unit 1101 sends the identifier of the first processing function entity to the routing unit 1102. The target processing unit 1101 is any one of the at least one processing unit 1101.

The routing unit 1102 is further configured to: receive the identifier of the first processing function entity that is sent by the target processing unit 1101, and generate the first forwarding policy according to the identifier of the first processing function entity and the traffic flow identifier.

In one embodiment, as shown in FIG. 11, the controller 100 includes at least one processing unit 1101 and a routing unit 1102.

The routing unit 1102 is configured to send the first forwarding policy to the first node.

The at least one processing unit 1101 is configured to send the corresponding processing policy to the one or more processing function entities in the processing network. The processing policy includes the second forwarding policy.

It should be noted that, FIG. 11 is drawn by using an example in which the controller includes one processing unit.

Figure 12:
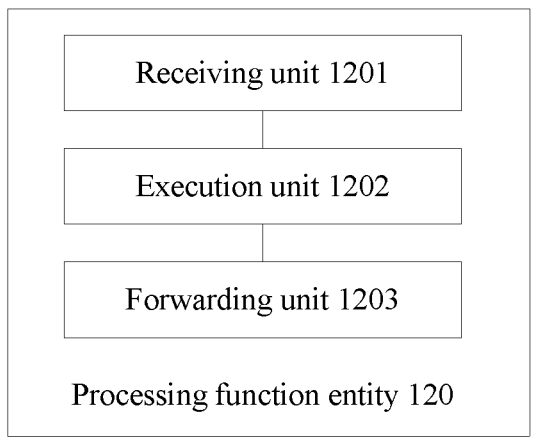
FIG. 12 is a schematic structural diagram of a processing function entity according to an embodiment of the present disclosure.

This embodiment of the present disclosure provides a processing function entity 120, configured to perform the method shown in FIG. 3, FIG. 4, or FIG. 5. As shown in FIG. 12, the processing function entity 120 includes:

a receiving unit 1201, configured to receive a processing policy;

an execution unit 1202, configured to process a received packet according to the processing policy; and a forwarding unit 1203, configured to forward a processed packet.

In one embodiment, the receiving unit 1201 is further configured to receive a second forwarding policy.

The forwarding unit 1203 is specifically configured to forward the processed packet according to the second forwarding policy.

According to the controller and the processing function entity provided in this embodiment of the present disclosure, the controller controls the processing function entity and the routing function entity in the processing network to process and forward a packet. The processing network is configured to process the packet. The processing network includes a computing resource. The routing function entity serves as an anchor point of a user IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

Embodiment 3

In hardware implementation, units in the controller in Embodiment 2 may be built in or independent of a processor of the controller in a hardware form, or may be stored in a memory of the controller in a software form, so that the processor invokes and performs operations corresponding to the units. The processor may be a central processing unit (CPU), a microprocessor, a single-chip microcomputer, or the like.

Figure 13:
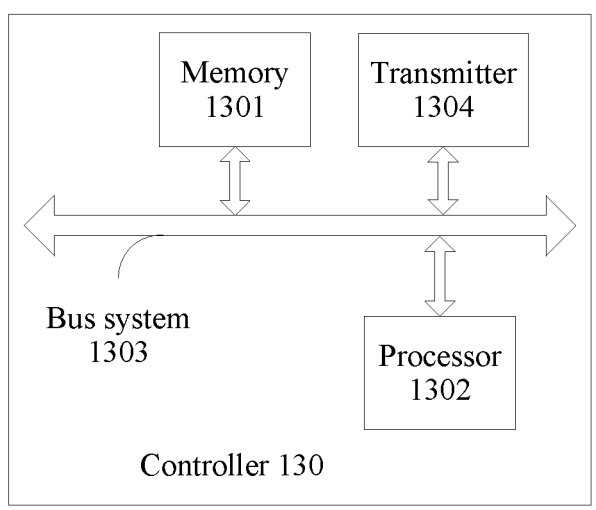
FIG. 13 is a schematic structural diagram of a controller according to an embodiment of the present disclosure.

As shown in FIG. 13, this embodiment of the present disclosure provides another controller 130, configured to perform the method shown in FIG. 1. The controller 130 includes a memory 1301, a processor 1302, and a bus system 1303.

The memory 1301 and the processor 1302 are coupled together by using the bus system 1303. The memory 1301 may include a random access memory, and may also include a non-volatile memory, such as at least one disk memory. The bus system 1303 may be an ISA bus, a PCI bus, an EISA bus, or the like. The bus system 1303 may be categorized into an address bus, a data bus, a control bus, and the like. For ease of representation, the bus system 1303 is represented by using only one thick line in FIG. 13. However, it does not mean that there is only one bus or only one type of bus.

The memory 1301 stores a group of code, and the code is used to control the processor 1302 to perform the following actions:

controlling a first node to send a received packet to a processing network, and controlling the processing network to process the packet and then send a processed packet to a second node. The first node is a base station or a network element connected to the base station, and the second node is a routing function entity; or the first node is the routing function entity, and the second node is the base station or a network element connected to the base station. The routing function entity is an anchor point of an Internet Protocol IP address of a user.

In one embodiment, the processing network includes at least one processing function entity.

In one embodiment, as shown in FIG. 13, the controller 130 further includes a transmitter 1304.

The transmitter 1304 is configured to send a first forwarding policy to the first node. The first forwarding policy is used to control the first node to send the received packet to a first processing function entity, the first processing function entity is a processing function entity in the processing network, the first forwarding policy is generated according to an identifier of the first processing function entity and a traffic flow identifier, and the packet carries the traffic flow identifier.

In one embodiment, the transmitter 1304 is further configured to send a corresponding processing policy and a second forwarding policy to one or more processing function entities in the processing network. The processing policy is used to control a processing function entity that receives the processing policy to process the received packet according to the processing policy, the second forwarding policy is used to control a processing function entity that receives the second forwarding policy to forward, according to the second forwarding policy, the packet processed by the processing function entity, the one or more processing function entities include the first processing function entity, and the processing policy is generated according to the traffic flow identifier.

In one embodiment, as shown in FIG. 13, the controller 130 further includes a transmitter 1304.

The transmitter 1304 is configured to send a first forwarding policy to the first node. The first forwarding policy is used to control the first node to forward the received packet to a forwarder, so that the forwarder forwards the packet to a first processing function entity. The first processing function entity is a processing function entity in the processing network.

In one embodiment, the transmitter 1304 is further configured to send a corresponding processing policy to one or more processing function entities in the processing network. The processing policy is used to control a processing function entity that receives the processing policy to process, according to the processing policy, the received packet sent by the forwarder, and then send the processed packet to the forwarder.

The transmitter 1304 is further configured to send a second forwarding policy to the forwarder. The second forwarding policy is used to control the forwarder to forward the received packet according to the second forwarding policy, so that the packet reaches the second node after the packet is sequentially processed by the one or more processing function entities.

In one embodiment, as shown in FIG. 13, the controller 130 further includes a transmitter 1304.

The transmitter 1304 is configured to send a corresponding processing policy to one or more processing function entities in the processing network. The processing policy is used to control a processing function entity that receives the processing policy to process, according to the processing policy, the received packet sent by the routing function entity, and then send the processed packet to the routing function entity.

The transmitter 1304 is further configured to send a first forwarding policy to the routing function entity. The first forwarding policy is used to control the routing function entity to forward the received packet according to the first forwarding policy, so that the packet reaches the second node after the packet is sequentially processed by the one or more processing function entities.

In one embodiment, when the first node is the base station or the network element connected to the base station, the transmitter 1304 is further configured to send a second forwarding policy to the first node. The second forwarding policy is used to control the first node to forward the received packet to the routing function entity, so that the routing function entity forwards the packet to a first processing function entity according to the first forwarding policy. The first processing function entity is a processing function entity in the processing network.

Figure 14:
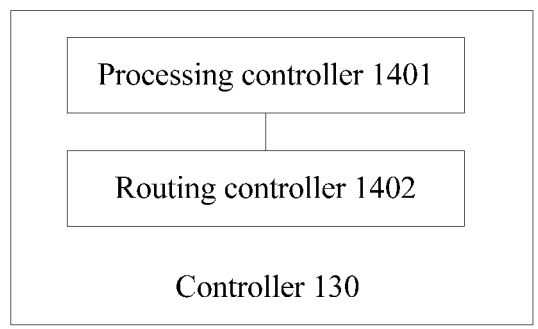
FIG. 14 is a schematic structural diagram of another controller according to an embodiment of the present disclosure.

In one embodiment, as shown in FIG. 14, the controller 130 includes at least one processing controller 1401 and a routing controller 1402.

The routing controller 1402 is configured to send the first forwarding policy and the second forwarding policy.

The at least one processing controller 1401 is configured to send the processing policy.

In one embodiment, as shown in FIG. 14, the controller 130 includes at least one processing controller 1401 and a routing controller 1402.

The routing controller 1402 is configured to: send the first forwarding policy to the first node, and send the corresponding second forwarding policy to the one or more processing function entities.

The at least one processing controller 1401 is configured to send the corresponding processing policy to the one or more processing function entities.

In one embodiment, the routing controller 1402 is further configured to: determine the traffic flow identifier, and send the traffic flow identifier to the at least one processing controller 1401.

The at least one processing controller 1401 is further configured to: receive the traffic flow identifier sent by the routing controller 1402, and generate, according to the traffic flow identifier, the processing policy corresponding to the one or more processing function entities.

In one embodiment, the at least one processing controller 1401 is further configured to determine the first processing function entity, and a target processing controller 1401 sends the identifier of the first processing function entity to the routing controller 1402. The target processing controller 1401 is any one of the at least one processing controller 1401.

The routing controller 1402 is further configured to: receive the identifier of the first processing function entity that is sent by the target processing controller 1401, and generate the first forwarding policy according to the identifier of the first processing function entity and the traffic flow identifier.

In one embodiment, as shown in FIG. 14, the controller 130 includes at least one processing controller 1401 and a routing controller 1402.

The routing controller 1402 is configured to send the first forwarding policy to the first node.

The at least one processing controller 1401 is configured to send the corresponding processing policy to the one or more processing function entities in the processing network. The processing policy includes the second forwarding policy.

It should be noted that, FIG. 14 is drawn by using an example in which the controller includes one processing controller 1401.

In hardware implementation, units in the processing function entity in Embodiment 2 may be built in or independent of a processor of the processing function entity in a hardware form, or may be stored in a memory of the processing function entity in a software form, so that the processor invokes and performs operations corresponding to the units. The processor may be a CPU, a microprocessor, a single-chip microcomputer, or the like.

Figure 15:
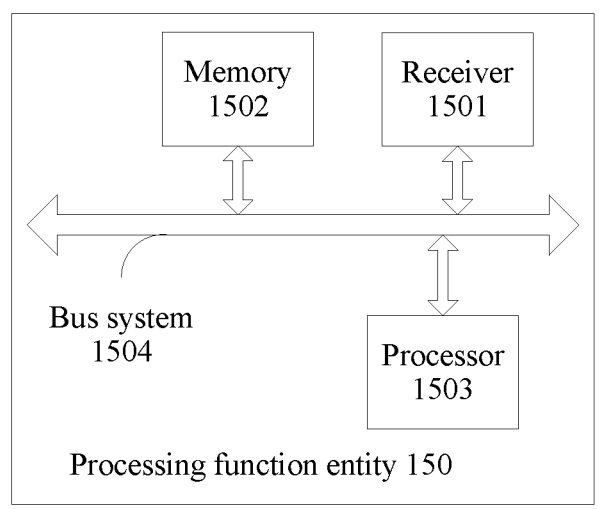
FIG. 15 is a schematic structural diagram of a processing function entity according to an embodiment of the present disclosure.

As shown in FIG. 15, this embodiment of the present disclosure provides another processing function entity 150, configured to perform the method shown in FIG. 3, FIG. 4, or FIG. 5. The processing function entity 150 includes a receiver 1501, a memory 1502, a processor 1503, and a bus system 1504.

The receiver 1501, the memory 1502, and the processor 1503 are coupled together by using the bus system 1504. The memory 1502 may include a random access memory, and may also include a non-volatile memory, such as at least one disk memory. The bus system 1504 may be an ISA bus, a PCI bus, an EISA bus, or the like. The bus system 1504 may be categorized into an address bus, a data bus, a control bus, and the like. For ease of representation, the bus system 1504 is represented by using only one thick line in FIG. 15. However, it does not mean that there is only one bus or only one type of bus.

The receiver 1501 is configured to receive a processing policy.

The memory 1502 stores a group of code, and the code is used to control the processor 1503 to perform the following actions: processing a received packet according to the processing policy, and forwarding a processed packet.

In one embodiment, the receiver 1501 is further configured to receive a second forwarding policy.

The processor 1503 is specifically configured to forward the processed packet according to the second forwarding policy.

According to the controller and the processing function entity provided in this embodiment of the present disclosure, the controller controls the processing function entity and the routing function entity in the processing network to process and forward a packet. The processing network is configured to process the packet. The processing network includes a computing resource. The routing function entity serves as an anchor point of a user IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

Embodiment 4

This embodiment of the present disclosure further provides a network system 160, configured to perform the method shown in FIG. 1. For related explanation in this embodiment of the present disclosure, refer to the foregoing embodiment. As shown in FIG. 16, the network system 160 includes a controller 1601, and a first node 1602, a processing network 1603, and a second node 1604 that are connected to the controller 1601.

The controller 1601 is configured to: control the first node 1602 to send a received packet to the processing network 1603, and control the processing network 1603 to process the packet and then send a processed packet to the second node 1604.

The processing network 1603 is configured to: receive the packet sent by the first node 1602; and process, under control of the controller 1601, the packet and then send the processed packet to the second node 1604.

The first node 1602 is configured to: receive the packet, and send, under control of the controller 1601, the packet to the processing network 1603.

The second node 1604 is configured to receive the packet sent by the processing network 1603.

The first node 1602 is a base station or a network element connected to the base station, and the second node 1604 is a routing function entity; or the first node 1602 is the routing function entity, and the second node 1604 is the base station or a network element connected to the base station. The routing function entity is an anchor point of an Internet Protocol IP address of a user.

It should be noted that, FIG. 16 to FIG. 20 are drawn by using an example in which the first node is a base station and the second node is a processing function entity.

In one embodiment, as shown in FIG. 17, the processing network 1603 includes at least one processing function entity 16031, and each of the at least one processing function entity 16031 is connected to the controller 1601.

FIG. 17 is drawn by using an example in which the processing network 1603 includes four processing function entities 16031. For ease of description in the foregoing specification, the four processing function entities 16031 are respectively drawn as processing function entities 1, 2, 3, and 4.

In one embodiment, the controller 1601 is specifically configured to send a first forwarding policy to the first node 1602. The first forwarding policy is used to control the first node 1602 to send the received packet to a first processing function entity 16031, the first processing function entity 16031 is a processing function entity 16031 in the processing network 1603, the first forwarding policy is generated according to an identifier of the first processing function entity 16031 and a traffic flow identifier, and the packet carries the traffic flow identifier.

The first node 1602 is specifically configured to: receive the first forwarding policy sent by the controller 1601, and forward the received packet to the first processing function entity 16031 according to the first forwarding policy.

In one embodiment, the controller 1601 is specifically configured to send a corresponding processing policy and a second forwarding policy to one or more processing function entities 16031 in the processing network 1603. The processing policy is used to control a processing function entity 16031 that receives the processing policy to process the received packet according to the processing policy, the second forwarding policy is used to control a processing function entity 16031 that receives the second forwarding policy to forward, according to the second forwarding policy, the packet processed by the processing function entity 16031, the one or more processing function entities 16031 include the first processing function entity 16031, and the processing policy is generated according to the traffic flow identifier.

Each of the one or more processing function entities 16031 is specifically configured to: receive a processing policy and a second forwarding policy that are corresponding to the processing function entity 16031 and are sent by the controller 1601, process the received packet according to the processing policy, and forward, according to the second forwarding policy, the packet processed by the processing function entity 16031.

In one embodiment, as shown in FIG. 18, the system further includes a forwarder 1605 connected to the controller 1601.

The controller 1601 is specifically configured to send a first forwarding policy to the first node 1602. The first forwarding policy is used to control the first node 1602 to forward the received packet to the forwarder 1605.

The first node 1602 is specifically configured to: receive the first forwarding policy sent by the controller 1601, and forward the received packet to the forwarder 1605 according to the first forwarding policy.

The forwarder 1605 is configured to: receive the packet sent by the first node 1602, and forward the packet to a first processing function entity 16031. The first processing function entity 16031 is a processing function entity 16031 in the processing network 1603.

FIG. 18 is drawn by using an example in which the processing network 1603 includes two processing function entities 16031. For ease of description in the foregoing specification, the two processing function entities 16031 are respectively drawn as processing function entities 1 and 2.

In one embodiment, the controller 1601 is further configured to send a corresponding processing policy to one or more processing function entities 16031 in the processing network 1603. The processing policy is used to control a processing function entity 16031 that receives the processing policy to process, according to the processing policy, the received packet sent by the forwarder 1605, and then send the processed packet to the forwarder 1605.

The controller 1601 is further configured to send a second forwarding policy to the forwarder 1605. The second forwarding policy is used to control the forwarder 1605 to forward the received packet according to the second forwarding policy.

The forwarder 1605 is specifically configured to: receive the second forwarding policy sent by the controller 1601, and forward the received packet according to the second forwarding policy, so that the packet reaches the second node 1604 after the packet is sequentially processed by the one or more processing function entities 16031.

Each of the one or more processing function entities 16031 is specifically configured to: receive a processing policy that is corresponding to the processing function entity 16031 and is sent by the controller 1601; and process, according to the processing policy, the received packet sent by the forwarder 1605, and then send the processed packet to the forwarder 1605.

In one embodiment, the controller 1601 is further configured to send a corresponding processing policy to one or more processing function entities 16031 in the processing network 1603. The processing policy is used to control a processing function entity 16031 that receives the processing policy to process, according to the processing policy, the received packet sent by the routing function entity, and then send the processed packet to the routing function entity.

The controller 1601 is further configured to send a first forwarding policy to the routing function entity. The first forwarding policy is used to control the routing function entity to forward the received packet according to the first forwarding policy.

The routing function entity is specifically configured to: receive the first forwarding policy sent by the controller 1601, and forward the received packet according to the first forwarding policy, so that the packet reaches the second node 1604 after the packet is sequentially processed by the one or more processing function entities 16031.

Each of the one or more processing function entities 16031 is specifically configured to: receive a processing policy that is corresponding to the processing function entity 16031 and is sent by the controller 1601; and process, according to the processing policy, the received packet sent by the routing function entity, and then send the processed packet to the routing function entity.

In one embodiment, when the first node 1602 is the base station or the network element connected to the base station, the controller 1601 is further configured to send a second forwarding policy to the first node 1602, where the second forwarding policy is used to control the first node 1602 to forward the received packet to the routing function entity;

the first node 1602 is specifically configured to: receive the second forwarding policy sent by the controller 1601, and forward the received packet to the routing function entity according to the second forwarding policy; and the routing function entity is configured to: receive the packet sent by the first node 1602, and forward the packet to the first processing function entity 16031 according to the first forwarding policy.

In one embodiment, as shown in FIG. 19, the controller 1601 includes at least one processing controller 16011 and a routing controller 16012. The routing controller 16012 is connected to the first node 1602, the second node 1604, and the one or more processing function entities 16031, and each of the one or more processing function entities 16031 is connected to at least one of the processing controller 16011.

The routing controller 16012 is specifically configured to: send the first forwarding policy to the first node 1602, and send the corresponding second forwarding policy to the one or more processing function entities 16031.

The at least one processing controller 16011 is specifically configured to send the corresponding processing policy to the one or more processing function entities 16031.

It should be noted that, FIG. 19 is drawn by using an example in which the controller includes one processing function entity 16011 and the processing network 1603 includes four processing function entities 16031. For ease of description in the foregoing specification, the four processing function entities 16031 are respectively drawn as processing function entities 1, 2, 3, and 4.

In one embodiment, as shown in FIG. 19, the routing controller 16012 is connected to each of the at least one processing controller 16011.

The routing controller 16012 is further configured to: determine the traffic flow identifier, and send the traffic flow identifier to the at least one processing controller 16011.

The at least one processing controller 16011 is further configured to: receive the traffic flow identifier sent by the routing controller 16012, and generate, according to the traffic flow identifier, the processing policy corresponding to the one or more processing function entities 16031.

In one embodiment, the at least one processing controller 16011 is further configured to determine the first processing function entity 16031, and a target processing controller 16011 sends the identifier of the first processing function entity 16031 to the routing controller 16012. The target processing controller 16011 is any one of the at least one processing controller 16011.

The routing controller 16012 is further configured to: receive the identifier of the first processing function entity 16031 that is sent by the target processing controller 16011, and generate the first forwarding policy according to the identifier of the first processing function entity 16031 and the traffic flow identifier.

In one embodiment, as shown in FIG. 19, the controller 1601 includes at least one processing controller 16011 and a routing controller 16012. The routing controller 16012 is connected to the first node 1602 and the second node 1604, and each of the one or more processing function entities 16031 is connected to at least one of the processing controller 16011.

The routing controller 16012 is configured to send the first forwarding policy to the first node 1602.

The at least one processing controller 16011 is configured to send the corresponding processing policy to the one or more processing function entities 16031. The processing policy includes the second forwarding policy.

In one embodiment, as shown in FIG. 20, the controller 1601 includes at least one processing controller 16011 and a routing controller 16012. The routing controller 16012 is connected to the first node 1602, the second node 1604, and the forwarder 1605, and each of the one or more processing function entities 16031 is connected to at least one of the processing controller 16011.

The routing controller 16012 is specifically configured to: send the first forwarding policy to the first node 1602, and send the second forwarding policy to the forwarder 1605.

The at least one processing controller 16011 is specifically configured to send the corresponding processing policy to the one or more processing function entities 16031.

In one embodiment, as shown in FIG. 19, the controller 1601 includes at least one processing controller 16011 and a routing controller 16012. The routing controller 16012 is connected to the first node 1602 and the second node 1604, and each of the N processing function entities 16031 is connected to at least one of the processing controller 16011.

The routing controller 16012 is specifically configured to: send the first forwarding policy to the routing function entity, and send the second forwarding policy to the first node 1602.

The at least one processing controller 16011 is specifically configured to send the corresponding processing policy to the one or more processing function entities 16031.

It should be noted that, FIG. 20 is drawn by using an example in which the controller includes two processing controllers 16011 and the processing network 1603 includes two processing function entities 16031. For ease of description in the foregoing specification, the two processing function entities 16031 are respectively drawn as processing function entities 1 and 2.

According to the system provided in this embodiment of the present disclosure, a forwarding plane is divided into a processing network and a routing function entity. The processing network is configured to process a packet, and therefore, the processing network includes a computing resource. The routing function entity serves as an anchor point of an IP address, and has an address resource. When a network has insufficient address resources, a routing function entity may be added. When the network has insufficient computing resources, a processing network may be added. Therefore, compared with the prior art, according to the method provided in this embodiment of the present disclosure, waste of an address resource or a computing resource can be reduced.

In all the embodiments, a packet transmitted between any two nodes in the network system can be forwarded by a forwarding device (for example, a router). Correspondingly, forwarding policies also need to be adjusted.

It may be clearly understood by persons skilled in the art that, for the purpose of convenient and brief description, division of the foregoing function modules is taken as an example for illustration. In actual application, the foregoing functions can be allocated to different function modules for implementation according to a requirement, that is, an inner structure of an apparatus is divided into different function modules to implement all or some of the functions described above. For a detailed working process of the foregoing apparatus and module, refer to a corresponding process in the foregoing method embodiments. Details are not described herein again.

In the several embodiments provided in the present disclosure, it should be understood that the disclosed apparatus and method may be implemented in other manners. For example, the described apparatus embodiment is merely an example. For example, the module division is merely logical function division and may be other division in actual implementation. For example, multiple modules or components may be combined or integrated into another system, or some features may be ignored or not performed. In addition, the displayed or discussed mutual couplings or direct couplings or communication connections may be implemented through some interfaces, or the indirect couplings or communication connections between the apparatuses or units.

In addition, function modules in the embodiments in the present disclosure may be integrated into one processing module, or each of the modules may exist alone physically, or two or more modules are integrated into one module. The integrated module may be implemented in a form of hardware, or may be implemented in a form of a software function module.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method of service processing, comprising:
sending, by a controller, a first forwarding policy to a routing function device, wherein the routing function device is an anchor point of an Internet Protocol (IP) address of a user equipment (UE), the first forwarding policy comprises identification information of a processing function device and identification information of a traffic flow including a traffic flow identifier of the traffic flow;
receiving, by the routing function device, the first forwarding policy from the controller;
sending, by the controller, a processing policy to the processing function device;
receiving, by the processing function device, the processing policy from the controller;
sending, by the controller, a second forwarding policy to the processing function device;
receiving, by the processing function device, the second forwarding policy from the controller;
receiving, by the routing function device, a packet from an external network, and sending the packet to the processing function device according to the first forwarding policy, wherein the packet comprises the identification information of the traffic flow; and
receiving, by the processing function device, the packet from the routing function device;
processing, by the processing function device, the received packet according to the processing policy; and
sending, by the processing function device, the packet to a base station according to the second forwarding policy.

2. The method according to claim 1, wherein the identification information of the traffic flow comprises an IP address of the UE, or IP quintuplets of the traffic flow.

3. The method according to claim 1, wherein the identification information of the processing function device comprises a tunnel identifier of the processing function device.

4. The method according to claim 1, wherein the second forwarding policy comprises identification information of the base station and the identification information of the traffic flow.

5. The method according to claim 1, wherein the processing policy comprises the identification information of the traffic flow.

6. The method according to claim 1, wherein processing, by the processing function device, the received packet according to the processing policy comprises:
executing, by the processing function device, at least one of quality of service (QoS) control, online/offline charging, deep packet inspection (DPI), lawful interception, Transmission Control Protocol (TCP) acceleration, or Hypertext Transfer Protocol (HTTP) header enrichment to the received packet.

7. A service processing system, comprising:
a controller, that sends a first forwarding policy and a second forwarding policy, wherein the first forwarding policy comprises identification information of a processing function device and identification information of a traffic flow including a traffic flow identifier of the traffic flow, wherein the controller further sends a processing policy to the processing function device, and;
a routing function device, that is an anchor point of an Internet Protocol (IP) address of a user equipment (UE), receives the first forwarding policy from the controller, receives a packet from an external network, and sends the packet to the processing function device according to the first forwarding policy, wherein the packet comprises the identification information of the traffic flow; and
wherein the processing function device receives the second forwarding policy and the processing policy from the controller, receives the packet from the routing function device, processes the received packet according to the processing policy, and sends the packet to a base station according to the second forwarding policy.

8. The system according to claim 7, wherein the identification information of the traffic flow comprises an IP address of the UE, or IP quintuplets of the traffic flow.

9. The system according to claim 7, wherein the identification information of the processing function device comprises a tunnel identifier of the processing function device.

10. The system according to claim 7, wherein the second forwarding policy comprises identification information of the base station and the identification information of the traffic flow.

11. The system according to claim 7, wherein the processing policy comprises the identification information of the traffic flow.

12. The system according to claim 7, where the processing function device executes at least one of quality of service (QoS) control, online/offline charging, deep packet inspection (DPI), lawful interception, Transmission Control Protocol (TCP) acceleration, or Hypertext Transfer Protocol (HTTP) header enrichment to the received packet.

* * * * *